United States Patent
Gao et al.

(10) Patent No.: US 10,667,123 B2
(45) Date of Patent: May 26, 2020

(54) METHOD FOR INSTALLING SUBSCRIPTION PROFILE, TERMINAL, AND SERVER

(71) Applicant: Huawei Technologies Co., Ltd., Shenzhen (CN)

(72) Inventors: Linyi Gao, Beijing (CN); Qiang Yi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/463,206

(22) PCT Filed: Nov. 22, 2016

(86) PCT No.: PCT/CN2016/106828
§ 371 (c)(1),
(2) Date: May 22, 2019

(87) PCT Pub. No.: WO2018/094581
PCT Pub. Date: May 31, 2018

(65) Prior Publication Data
US 2019/0364415 A1 Nov. 28, 2019

(51) Int. Cl.
*H04W 8/20* (2009.01)
*H04W 8/18* (2009.01)
*H04W 12/08* (2009.01)

(52) U.S. Cl.
CPC ............. *H04W 8/20* (2013.01); *H04W 8/183* (2013.01); *H04W 12/08* (2013.01)

(58) Field of Classification Search
CPC ........ H04W 8/20; H04W 12/08; H04W 8/183
See application file for complete search history.

(56) References Cited

U.S. PATENT DOCUMENTS

2014/0031029 A1 1/2014 Rajagopalan et al.
2014/0087790 A1 3/2014 Babbage et al.
(Continued)

FOREIGN PATENT DOCUMENTS

CN 103493526 A 1/2014
CN 103595573 A 2/2014
(Continued)

OTHER PUBLICATIONS

Machine Translation and Abstract of Chinese Publication No. CN103595573, Feb. 19, 2014, 14 pages.
(Continued)

*Primary Examiner* — Chuong A Ngo
(74) *Attorney, Agent, or Firm* — Conley Rose, P.C.

(57) ABSTRACT

Embodiments include a method for installing a subscription profile, a terminal, and a server. The method includes obtaining, by a local profile assistant (LPA) in the terminal, metadata of a subscription profile, determining, based on an authorization file, whether use of each policy rule included in the metadata is allowed. The method further includes obtaining, by the LPA, the subscription profile when the use of each policy rule included in the metadata is allowed. The method further includes sending the subscription profile to an embedded universal integrated circuit card (eUICC) in the terminal. The method further includes determining, by the eUICC based on the authorization file, whether use of the subscription profile is allowed. The method further includes installing, by the eUICC, the subscription profile when the use of the subscription profile is allowed.

13 Claims, 15 Drawing Sheets

(56) References Cited

U.S. PATENT DOCUMENTS

| | | |
|---|---|---|
| 2015/0350219 A1 | 12/2015 | Selander et al. |
| 2016/0283216 A1 | 9/2016 | Gao |
| 2016/0323743 A1 | 11/2016 | Gerstenberger et al. |
| 2017/0064552 A1* | 3/2017 | Park .................... H04L 63/0869 |
| 2017/0077975 A1 | 3/2017 | Wang et al. |
| 2017/0149827 A1* | 5/2017 | Sims ....................... H04W 8/00 |
| 2018/0123803 A1 | 5/2018 | Park et al. |

FOREIGN PATENT DOCUMENTS

| | | |
|---|---|---|
| CN | 104703170 A | 6/2015 |
| CN | 104769980 A | 7/2015 |
| CN | 105637498 A | 6/2016 |
| KR | 20140070195 A | 6/2014 |
| WO | 2015090585 A1 | 6/2015 |
| WO | 2016167551 A1 | 10/2016 |

OTHER PUBLICATIONS

"Introduction of Policy Rules," CR 2128, CRs to Remote Provisioning Technical Specification, SGP.22, Draft version v1.9.21, dated Jun. 2, 2016, 22 pages.

"Introduction of Policy Rules," CR 2128, CRs to Remote Provisioning Technical Specification, SGP. 22, Draft Version v1.9.14, Jun. 2, 2016, 19 pages.

GSM Association "SGP.21 RSP Architecture v2.0 (Current)," SGP. 21 CR1001 RSP Architecture, Feb. 19, 2016, 103 pages.

"RSP Architecture Version 1.0," GSM Association Official Document SGP.21, Dec. 23, 2015, 52 pages.

Foreign Communication From a Counterpart Application, PCT Application No. PCT/CN2016/106828, English Translation of International Search Report dated Jul. 27, 2017, 2 pages.

Foreign Communication From a Counterpart Application, PCT Application No. PCT/CN2016/106828, English Translation of Written Opinion dated Jul. 27, 2017, 5 pages.

\* cited by examiner

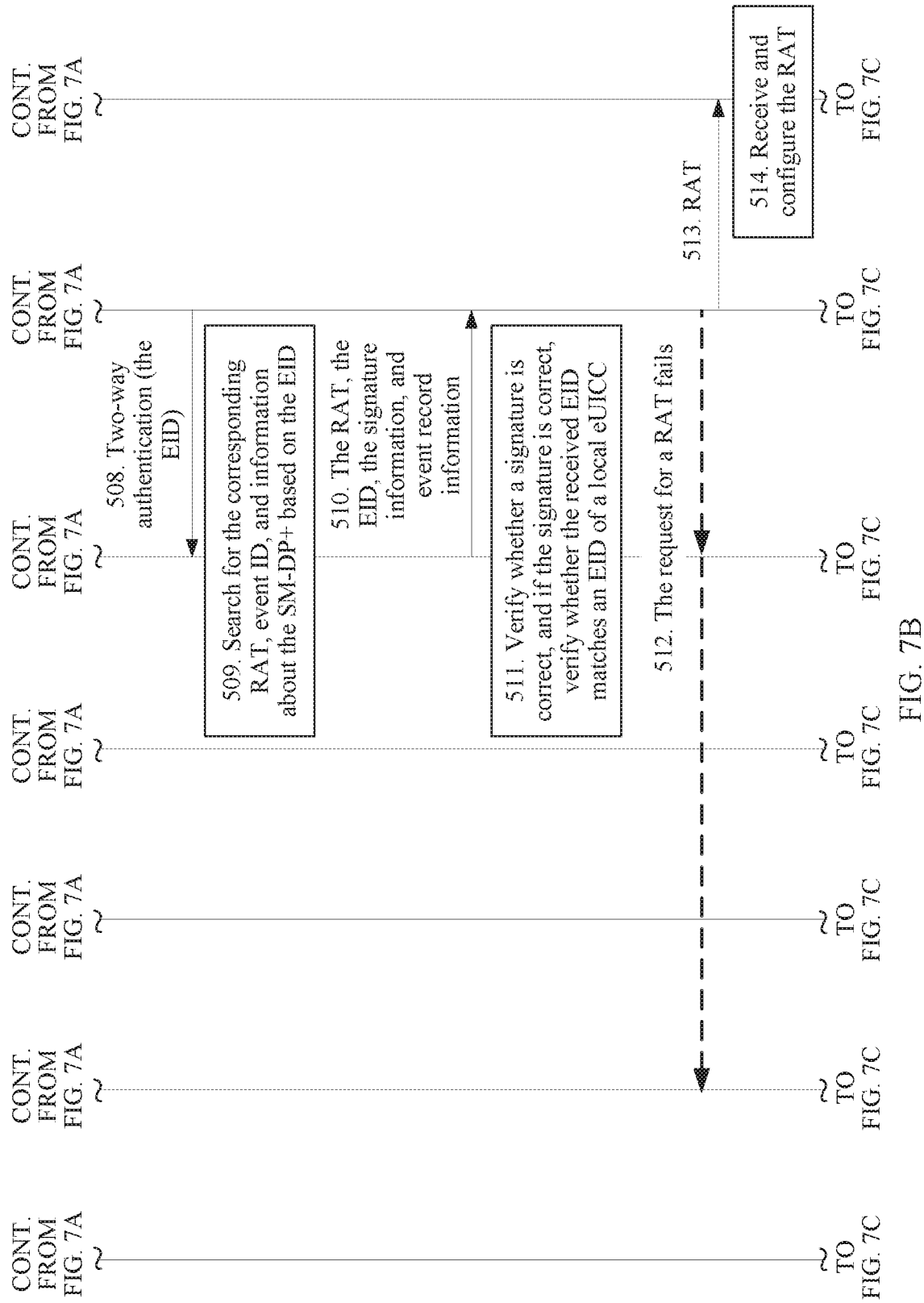

METHOD FOR INSTALLING SUBSCRIPTION PROFILE, TERMINAL, AND SERVER

CROSS-REFERENCE TO RELATED APPLICATIONS

This application is a U.S. National Stage of International Patent Application No. PCT/CN2016/106828 filed on Nov. 22, 2016, which is hereby incorporated by reference in its entirety.

TECHNICAL FIELD

The present invention relates to the communications field, and in particular, to a method for installing a subscription profile, a terminal, and a server.

BACKGROUND

Currently, a terminal user purchases a SIM (Subscriber Identification Module, subscriber identification module) card or a UICC (Universal Integrated Circuit Card, universal integrated circuit card) from an operator, and can access, based on a profile written to the card, a network of the operator by inserting the SIM card or the UICC into a terminal (device). An eUICC is a UICC that supports secure remote management of a subscription profile (profile) and/or a UICC that supports local management of a profile.

Because the eUICC is usually integrated into a terminal by a terminal manufacturer, and is usually not purchased or manufactured by the operator, after the terminal leaves a factory, the eUICC may not include data that allows access to the network of the operator. The terminal needs to connect to an SM-DP+ (Subscription Manager-Data Preparation+, subscription manager-data preparation entity) by using a remote management technology, to receive a profile delivered by the SM-DP+, and download the profile to the eUICC, so that the eUICC can then access the network of the operator by using the profile.

The profile may include a plurality of policy rules (policy rules). A RAT (Rules Authorization Table, rules authorization table) is preconfigured in the terminal. The RAT records applicable-operator information and user authorization information that are respectively corresponding to the plurality of policy rules, and limits a rule with which the operator needs to comply when setting the policy rules. For example, the RAT records that a policy rule 1 applies to an operator A and an application condition is that user consent is required. If a profile includes the policy rule 1, and the profile including the policy rule 1 is installed in the terminal, when the terminal is to access the operator A based on the profile, the terminal can access a network only after obtaining the user consent.

The prior art does not relate to how to download the RAT to the eUICC in the terminal, and an existing RAT lists only a list of operators that are allowed to use a policy rule, where either all operators are allowed to use the policy rule or a specific operator is allowed to use the policy rule. In addition, there is a case in which use of one or more policy rules is forbidden in some regions, and according to the prior art, these policy rules may not be defined in the RAT. In this case, these policy rules not only cannot be used in the regions, but also cannot be used in other regions. This greatly limits an application scope of the terminal.

SUMMARY

Embodiments of the present invention provide a method for installing a subscription profile, a terminal, and a server, so that when an authorization file defines a region in which a policy rule cannot be used, the terminal can download the authorization file, so that use of the policy rule by an operator in the specific region can be limited based on the authorization file, and an application scope of the terminal is effectively expanded.

To achieve the foregoing objective, the following technical solutions are used in the embodiments of the present invention.

According to a first aspect, a method for installing a subscription profile is disclosed. The method is applied to a terminal. The terminal includes an LPA and art eUICC. The method includes: the LPA obtains metadata of a subscription profile, where a policy rule included in the metadata is the same as a policy rule included in a subscription profile that is to be downloaded by the terminal. Then, the LPA determines, based on an authorization file, whether use of each policy rule included in the metadata is allowed, where the authorization file includes an identifier of at least one policy rule and forbidden-region information corresponding to each of the at least one policy rule. If the LPA at least determines that the use of each policy rule included in the metadata is allowed, the LPA obtains the subscription profile, and sends the obtained subscription profile to the eUICC in the terminal. Likewise, the eUICC may further determine, based on the authorization file, whether use of the subscription profile is allowed, and if the eUICC determines that the use of the subscription profile is allowed, the eUICC installs the subscription profile. Certainly, if the eUICC determines that the use of the subscription profile is not allowed, the eUICC may give up installation, for example, discard the subscription profile.

A RAT in the prior art lists only a list of operators that are allowed to use a policy rule, where either all operators are allowed to use the policy rule or a specific operator is allowed to use the policy rule. If use of one or more policy rules is forbidden in some regions, according to the prior art, these policy rules may not be defined in the RAT. In this case, these policy rules not only cannot be used in the regions, but also cannot be used in other regions. This greatly limits an application scope of the terminal. In this embodiment of the present invention, the LPA in the terminal obtains the authorization file, and then transfers the authorization file to the eUICC in the terminal for configuration. In addition, a region in which a policy rule cannot be used is defined in the authorization file, so that use of the policy rule by an operator in the specific region can be limited based on the authorization file, and there is no need to limit use of the policy rule by operators in all regions. In this way, the application scope of the terminal is effectively expanded.

With reference to the first aspect, in a first possible implementation of the first aspect, that the LPA determines, based on an authorization file, whether use of each policy rule included in the metadata is allowed includes: for each policy rule included in the metadata, the LPA first determines whether the authorization file includes an identifier of the policy rule; and if the authorization file does not include the identifier of the policy rule, in other words, the received authorization file does not define the policy rule, the LPA forbids use of the policy rule. If the authorization file includes the identifier of the policy rule, the LPA further needs to determine whether region information of an operator corresponding to the subscription profile belongs to forbidden-region information corresponding to the policy rule, and if the region information of the operator corresponding to the subscription profile does not belong to the forbidden-region information corresponding to the policy rule, the LPA allows use of the policy rule, or if the region information of the operator corresponding to the subscription profile belongs to the forbidden-region information corresponding to the policy rule, the LPA forbids use of the policy rule.

In this way, use of some policy rules may be specifically limited based on the forbidden-region information of the policy rule in the authorization file, and an application scope of the terminal is greatly expanded.

With reference to the first possible implementation of the first aspect, in a second possible implementation of the first aspect, in addition to recording identifier information and forbidden information of the policy rule, the authorization file further records a management indicator, user authorization information, and applicable-operator information of the policy rule. The user authorization information indicates whether setting of the policy rule requires user consent, and the applicable-operator information is information about an operator that is allowed to use the policy rule. The management indicator may be an addition indicator or a deletion indicator. The addition indicator indicates that the policy rule is to be added, and the deletion indicator indicates that the policy rule is to be deleted.

In this way, after the authorization file is received, a policy rule in a local existing authorization file may be further updated based on a management indicator of each policy rule in the authorization file, whether setting of a specific policy rule requires user authorization may be further determined based on the user authorization information, and whether a specific operator may use the policy rule may be further determined based on the applicable-operator information of the policy rule. This helps the terminal install a subscription file based on the authorization file, to access, based on the subscription file, a network provided by the operator.

With reference to the second possible implementation of the first aspect, in a third possible implementation of the first aspect, after the LPA determines that the region information of the operator corresponding to the subscription profile does not belong to the forbidden-region information corresponding to the policy rule, the LPA determines whether the user authorization information corresponding to the policy rule in the authorization file indicates that setting of the policy rule requires user consent. If the user authorization information indicates that the setting of the policy rule does not require user consent, the LPA allows use of the policy rule, or if the user authorization information indicates that the setting of the policy rule requires user consent, after determining that a user consents to the setting of the policy rule, the LPA allows use of the policy rule.

In other words, if user authorization information of a policy rule in the authorization file indicates that setting of the policy rule requires user consent, use of the policy rule is allowed only after user consent is obtained.

With reference to the second possible implementation of the first aspect, in a fourth possible implementation of the first aspect, after the LPA obtains the subscription profile, the method further includes: the LPA determines a policy rule that requires user authorization in the subscription profile, where the policy rule that requires user authorization is a policy rule that can be set only when user consent is obtained; and when the LPA determines that a user consents to setting of the policy rule that requires user authorization, the LPA sends the subscription profile to the eUICC.

After obtaining the subscription profile, for policy rules that can be set only when user authorization is obtained, the LPA may uniformly prompt the user, and can set these policy rules only after user consent is obtained.

With reference to any one of the first to the fourth possible implementations of the first aspect, in a fifth possible implementation of the first aspect, the method further includes: the LPA obtains the authorization file and sends the authorization file to the eUICC; and the eUICC receives and configures the authorization file.

It should be noted that in this embodiment of the present invention, an authorization file may be preconfigured in the eUICC in the terminal, or the LPA in the terminal may obtain the authorization file and then deliver the authorization file to the eUICC in the terminal.

With reference to the fifth possible implementation of the first aspect, in a sixth possible implementation of the first aspect, that the eUICC receives and configures the authorization file specifically includes: if there is no local authorization file in the eUICC, for example, no authorization file is installed locally, the eUICC stores the authorization file; or if there is an existing authorization file in the eUICC, the eUICC needs to update the local existing authorization file based on the authorization file.

With reference to the sixth possible implementation of the first aspect, in a seventh possible implementation of the first aspect, that the eUICC updates the local existing authorization file based on the authorization file specifically includes: for each of the at least one policy rule, if the management indicator of the policy rule in the authorization file is addition, the eUICC adds the policy rule, the user authorization information of the policy rule, the applicable-operator information of the policy rule, and the forbidden-region information of the policy rule to the local existing authorization file.

In other words, for a policy rule whose management indicator in the authorization file is addition, information such as forbidden-region information and user authorization information corresponding to the policy rule is directly added to the local existing authorization file.

With reference to the fifth possible implementation of the first aspect, in an eighth possible implementation of the first aspect, that the eUICC updates the local existing authorization file based on the authorization file specifically includes:

for each of the at least one policy rule, if the management indicator of the policy rule in the authorization file is removal, user authorization information of the policy rule in the local existing authorization file is the user authorization information, applicable-operator information of the policy rule in the local existing authorization file is the applicable-operator information, and forbidden-region information of the policy rule in the local existing authorization file is the forbidden-region information, the eUICC deletes, from the local existing authorization file, the policy rule and the user authorization information, the applicable-operator information, and the forbidden-region information that are corresponding to the policy rule; or for each of the at least one policy rule, if the management indicator of the policy rule in the authorization file is removal, applicable-operator information of the policy rule in the local existing authorization file includes the applicable-operator information and operator information other than the operator information, user authorization information of the policy rule in the local existing authorization file includes at least the user authorization information, and forbidden-region information of the policy rule in the local existing authorization file includes at least the forbidden-region information, the eUICC deletes the applicable-operator information from the applicable-operator information of the policy rule in the local existing authorization file; or for each of the at least one policy rule, if the management indicator of the policy rule in the authorization file is removal, user authorization information of the policy rule in the local existing authorization file includes the user authorization information and user authorization information other than the user authorization information, applicable-operator information of the policy rule in the local existing authorization file includes at least the applicable-operator information, and forbidden-region information of the policy rule in the local existing authorization file includes at least the forbidden-region information, the eUICC deletes the user authorization information from the user authorization information of the policy rule in the local existing authorization file; or if the management indicator of the policy rule in the authorization file is removal, forbidden-region information of the policy rule in the local existing authorization file includes the forbidden-region information and forbidden-region information other than the forbidden-region information, applicable-operator information of the policy rule in the local existing authorization file includes at least the applicable-operator information, and user authorization information of the policy rule in the local existing authorization file includes at least the user authorization information, the eUICC deletes the forbidden-region information from the forbidden-region information of the policy rule in the local existing authorization file.

If a management indicator of a policy rule in the delivered authorization file is deletion, and information about the policy rule recorded in the local existing authorization file is completely the same as information about the policy rule recorded in the delivered authorization file, all the information about the policy rule recorded in the local existing file is directly deleted. If information about the policy rule recorded in the local existing authorization file is not completely the same as information about the policy rule recorded in the delivered authorization file, a part of the locally recorded information about the policy rule needs to be deleted, so that remained information about the policy rule is different from the information recorded in the delivered authorization file. For example, applicable-operator information, user authorization information, and forbidden-region information of a policy rule 1 in the local existing authorization file are respectively AE, B, and C, and applicable-operator information, user authorization information, and forbidden-region information of the policy rule 1 in the delivered authorization file are respectively A, B, and C. In this case, the eUICC deletes A from the information about the policy rule 1 in the local authorization file, and retains the following information: applicable-operator information E, the user authorization information B, and the forbidden-region information C.

With reference to the fifth possible implementation of the first aspect, in a ninth possible implementation of the first aspect, that the LPA obtains the authorization file specifically includes:

the eUICC performs authentication with a first subscription management server, where in this process, an ID of the eUICC (a second EID) is sent to the first subscription management server, so that the first subscription management server determines an authorization file that matches the second EID, and delivers the authorization file to the LPA; and then, the LPA receives the authorization file sent by the first subscription management server.

With reference to the ninth possible implementation of the first aspect, in a tenth possible implementation of the first aspect, the method further includes:

the LPA receives signature information and a first EID associated with the authorization file that are sent by the first subscription management server, where the signature information is generated based on the first EID and the authorization file; and then, the LPA verifies whether the signature information is correct; and if the signature information is correct, the LPA determines whether the first EID is the same as the second EID, where the second EID is the ID of the eUICC; and if the first EID is the same as the second EID, the LPA sends the authorization file to the eUICC.

In this way, the LPA can determine whether the received authorization file is an authorization file corresponding to the terminal.

With reference to the tenth possible implementation of the first aspect, in an eleventh possible implementation of the first aspect, the LPA receives an event identifier ID and information about a second subscription management server; and then, the LPA obtains the subscription profile from the second subscription management server based on the event ID and the information about the second subscription management server.

With reference to the eleventh possible implementation of the first aspect, in a twelfth possible implementation of the first aspect, if the LPA verifies that the signature information is incorrect, the LPA discards the received event identifier ID and information about the second subscription management server that are sent by the first subscription management server, and notifies the first subscription server.

With reference to the eleventh possible implementation of the first aspect, in a thirteenth possible implementation of the first aspect, the method further includes: if the first EID is different from the second EID, the LPA discards the received event identifier ID and information about the second subscription management server that are sent by the first subscription management server, and notifies the first subscription server.

With reference to the fifth possible implementation of the first aspect, in a fourteenth possible implementation of the first aspect, before the eUICC configures the authorization file, the method further includes: the eUICC verifies whether any subscription profile has been currently installed in the terminal; and if no subscription profile has been currently installed in the terminal, the eUICC configures the authorization file, or if a subscription profile has been currently installed in the terminal, the eUICC gives up installation of the obtained subscription profile.

With reference to the fifth possible implementation of the first aspect, in a fifteenth possible implementation of the first aspect, that the LPA obtains the authorization file specifically includes: the LPA obtains an event ID from a first subscription management server, and then sends a subscription profile download request to a second subscription server, where the subscription profile download request carries the event ID and a second EID, so that the second subscription server determines to determine the authorization file based on the event ID and the second EID and sends the authorization file to the LPA, where the second EID is an ID of the eUICC in the terminal; and the LPA receives the authorization file sent by the second subscription server, where the event ID is an event ID generated by the second subscription management server to download the subscription profile.

With reference to the fifteenth possible implementation of the first aspect, in a sixteenth possible implementation of the first aspect, the method further includes: the LPA receives a first EID and signature information that are sent by the second subscription server, where the first EID is an EID associated with the authorization file, and the signature information is generated based on the first EID and the authorization file; and the LPA verifies whether the signature information is correct; and if the signature information is correct, the LPA determines whether the first EID is the same as the second EID. That the LPA sends the authorization file to the eUICC includes: if the first EID is the same as the second EID, the LPA sends the authorization file to the eUICC.

In other words, the LPA delivers the authorization file to the eUICC in the terminal only after determining that the received authorization file is an authorization file corresponding to the terminal.

With reference to the sixteenth possible implementation of the first aspect, in a seventeenth possible implementation of the first aspect, after the eUICC receives and configures the authorization file, the method further includes: the eUICC sends a response message to the LPA, where the response message is used to indicate that the eUICC successfully configures the authorization file; and the LPA sends the response message to the second subscription server, so that the second subscription server receives the response message and then sends the subscription profile to the LPA.

With reference to the fifteenth possible implementation of the first aspect, in an eighteenth possible implementation of the first aspect, the method further includes: the LPA receives the subscription profile sent by the second subscription server.

In other words, the second subscription server may further deliver the subscription profile to the terminal when delivering the authorization file.

According to a second aspect, a method for installing a subscription profile is disclosed, including:

a first subscription management server obtains a second EID, where the second EID is an identifier ID of an integrated circuit card eUICC in a terminal; the first subscription management server determines an authorization file associated with the second EID, where the authorization file includes an identifier of at least one policy rule and forbidden-region information corresponding to each of the at least one policy rule; and the first subscription management server sends the authorization file to a local profile assistant LPA in the terminal, so that the LPA sends the authorization file to the eUICC to determine whether to install a subscription profile.

With reference to the second aspect, in a first possible implementation of the second aspect, before the first subscription management server obtains the second EID, the method further includes: the first subscription management server obtains signature information and a first EID that is associated with the authorization file, where the signature information is generated based on the first EID and the authorization file. The method further includes: the first subscription management server sends the first EID and the signature information to the LPA, so that the LPA sends the authorization file to the eUICC after verifying that the signature information is correct and determining that the first EID is the same as the second EID.

According to a third aspect, a method for installing a subscription profile is disclosed, including:

a second subscription management server obtains an event identifier ID and a second EID from a terminal, where the event ID is an event ID generated by the second subscription server for the terminal to download a subscription profile, and the second EID is an ID of an integrated circuit card eUICC in the terminal; the second subscription management server determines, based on the event ID and the second EID, a subscription profile that matches the second EID; the second subscription management determines whether there is an authorization file associated with the subscription profile; and if there is an authorization file associated with the subscription profile, the second subscription management server sends the authorization file associated with the subscription profile to a local profile assistant LPA in the terminal, so that the LPA sends the authorization file to the eUICC in the terminal to determine whether to install the subscription profile.

With reference to the third aspect, in a first possible implementation of the third aspect, that the second subscription management server determines, based on the event ID and the second EID, the subscription profile that matches the second EID includes: the second subscription management server determines a subscription profile associated with the event ID; the second subscription management server determines whether a first EID associated with the subscription profile is the same as the second EID; and if the first EID is the same as the second EID, the second subscription management server determines that the subscription profile is a subscription profile that matches the eUICC.

With reference to the third aspect, in a second possible implementation of the third aspect, that the second subscription management server determines, based on the event ID and the second EID, a subscription profile that matches the second EID includes: the second subscription management server determines a subscription profile associated with the second EID; the second subscription management server determines whether an event ID associated with the subscription profile is the same as the event ID; and if the event ID associated with the subscription profile is the same as the event ID, the second subscription management server determines that the subscription profile is a subscription profile that matches the eUICC.

With reference to the third aspect or the first or the second possible implementation of the third aspect, in a third possible implementation of the third aspect, before the second subscription management server obtains the event identifier ID and the second EID from the terminal, the method further includes:

the second subscription management server generates the subscription profile for the terminal, and generates the event ID; and the second subscription management server registers the event ID and the second EID with a first subscription management server, so that the terminal obtains the event ID from the first subscription management server.

According to a fourth aspect, a terminal is disclosed, including:

a processor, configured to: obtain metadata of a subscription profile, where the metadata includes a policy rule; determine, based on an authorization file, whether use of each policy rule included in the metadata is allowed; and if it is at least determined that the use of each policy rule included in the metadata is allowed, obtain the subscription profile, and send the subscription profile to an integrated circuit card eUICC in the terminal, where the subscription profile is the same as the policy rule included in the metadata, the authorization file includes an identifier of at least one policy rule and forbidden-region information corresponding to each of the at least one policy rule; and the eUICC, configured to: determine, based on the authorization file, whether use of the subscription profile is allowed; and if the eUICC determines that the use of the subscription profile is allowed, install the subscription profile.

With reference to the fourth aspect, in a first possible implementation of the fourth aspect, the processor is specifically configured to: for each policy rule included in the metadata, determine whether the authorization file includes an identifier of the policy rule; and if the authorization file does not include the identifier of the policy rule, forbid use of the policy rule; or if the authorization file includes the identifier of the policy rule, further determine whether region information of an operator corresponding to the subscription profile belongs to forbidden-region information corresponding to the policy rule, and if the region information of the operator corresponding to the subscription profile does not belong to the forbidden-region information corresponding to the policy rule, allow use of the policy rule, or if the region information of the operator corresponding to the subscription profile belongs to the forbidden-region information corresponding to the policy rule, forbid use of the policy rule.

With reference to the first possible implementation of the fourth aspect, in a second possible implementation of the fourth aspect, the authorization file further includes a management indicator of each of the at least one policy rule, user authorization information of each of the at least one policy rule, and applicable-operator information of each of the at least one policy rule; and for each of the at least one policy rule, the user authorization information indicates whether setting of the policy rule requires user consent; and for each of the at least one policy rule, the applicable-operator information is information about an operator that is allowed to use the policy rule.

With reference to the second possible implementation of the fourth aspect, in a third possible implementation of the fourth aspect, the processor is further configured to: after determining that the region information of the operator corresponding to the subscription profile does not belong to the forbidden-region information corresponding to the policy rule, continue to determine whether the user authorization information corresponding to the policy rule in the authorization file indicates that setting of the policy rule requires user consent; and if the user authorization information indicates that the setting of the policy rule does not require user consent, allow use of the policy rule, or if the user authorization information indicates that the setting of the policy rule requires user consent, after determining that a user consents to the setting of the policy rule, allow use of the policy rule.

With reference to the second possible implementation of the fourth aspect, in a fourth possible implementation of the fourth aspect, the processor is further configured to: after obtaining the subscription profile, determine a policy rule that requires user authorization in the subscription profile, where the policy rule that requires user authorization is a policy rule that can be set only when user consent is obtained; and after determining that a user consents to setting of the policy rule that requires user authorization, send the subscription profile to the eUICC.

With reference to any one of the second to the fourth possible implementations of the fourth aspect, in a fifth possible implementation of the fourth aspect, the processor is further configured to: obtain the authorization file, and send the authorization file to the eUICC; and the eUICC is further configured to receive and configure the authorization file.

With reference to the fourth possible implementation of the fourth aspect, in a sixth possible implementation of the fourth aspect, the eUICC is specifically configured to: if there is no local authorization file in the eUICC, store the authorization file; or if there is an existing authorization file in the eUICC, update the local existing authorization file based on the authorization file.

With reference to the sixth possible implementation of the fourth aspect, in a seventh possible implementation of the fourth aspect, the eUICC is specifically configured to: for each of the at least one policy rule, if the management indicator of the policy rule in the authorization file is addition, add, by the eUICC, the policy rule, the user authorization information of the policy rule, the applicable-operator information of the policy rule, and the forbidden-region information of the policy rule to the local existing authorization file.

With reference to the sixth possible implementation of the fourth aspect, in an eighth possible implementation of the fourth aspect, the eUICC is specifically configured to: for each of the at least one policy rule, if the management indicator of the policy rule in the authorization file is removal, user authorization information of the policy rule in the local existing authorization file is the user authorization information, applicable-operator information of the policy rule in the local existing authorization file is the applicable-operator information, and forbidden-region information of the policy rule in the local existing authorization file is the forbidden-region information, delete, from the local existing authorization file, the policy rule and the user authorization information, the applicable-operator information, and the forbidden-region information that are corresponding to the policy rule; or for each of the at least one policy rule, if the management indicator of the policy rule in the authorization file is removal, applicable-operator information of the policy rule in the local existing authorization file includes the applicable-operator information and operator information other than the operator information, user authorization information of the policy rule in the local existing authorization file includes at least the user authorization information, and forbidden-region information of the policy rule in the local existing authorization file includes at least the forbidden-region information, delete the applicable-operator information from the applicable-operator information of the policy rule in the local existing authorization file; or for each of the at least one policy rule, if the management indicator of the policy rule in the authorization file is removal, user authorization information of the policy rule in the local existing authorization file includes the user authorization information and user authorization information other than the user authorization information, applicable-operator information of the policy rule in the local existing authorization file includes at least the applicable-operator information, and forbidden-region information of the policy rule in the local existing authorization file includes at least the forbidden-region information, delete the user authorization information from the user authorization information of the policy rule in the local existing authorization file; or if the management indicator of the policy rule in the authorization file is removal, forbidden-region information of the policy rule in the local existing authorization file includes the forbidden-region information and forbidden-region information other than the forbidden-region information, applicable-operator information of the policy rule in the local existing authorization file includes at least the applicable-operator information, and user authorization information of the policy rule in the local existing authorization file includes at least the user authorization information, delete the forbidden-region information from the forbidden-region information of the policy rule in the local existing authorization file.

With reference to the fifth possible implementation of the fourth aspect, in a ninth possible implementation of the fourth aspect, the eUICC is further configured to perform authentication with a first subscription management server, so that the first subscription management server determines the authorization file and delivers the authorization file to the processor; and the processor is further configured to receive the authorization file sent by the first subscription management server.

With reference to the ninth possible implementation of the fourth aspect, in a tenth possible implementation of the fourth aspect, the processor is further configured to: receive signature information and a first EID associated with the authorization file that are sent by the first subscription management server, where the signature information is generated based on the first EID and the authorization file; and verify whether the signature information is correct; and if the signature information is correct, determine whether the first EID is the same as a second EID, where the second EID is an ID of the eUICC; and if the first EID is the same as the second EID, send the authorization file to the eUICC.

With reference to the tenth possible implementation of the fourth aspect, in an eleventh possible implementation of the fourth aspect, the processor is further configured to receive an event identifier ID and information about a second subscription management server; and the processor is specifically configured to obtain the subscription profile from the second subscription management server based on the event ID and the information about the second subscription management server.

With reference to the tenth possible implementation of the fourth aspect, in a twelfth possible implementation of the fourth aspect, the processor is further configured to: if the processor verifies that the signature information is incorrect, discard the received event identifier ID and information about the second subscription management server that are sent by the first subscription management server, and notify the first subscription server.

With reference to the eleventh possible implementation of the fourth aspect, in a thirteenth possible implementation of the fourth aspect, the processor is further configured to: if the processor determines that the first EID is different from the second EID, discard the received event identifier ID and information about the second subscription management server that are sent by the first subscription management server, and notify the first subscription server.

With reference to the fifth possible implementation of the fourth aspect, in a fourteenth possible implementation of the fourth aspect, the eUICC is further configured to: before configuring the authorization file, verify whether any subscription profile has been currently installed in the terminal; and if the eUICC determines that no subscription profile has been currently installed in the terminal, configure, by the eUICC, the authorization file.

With reference to the fifth possible implementation of the fourth aspect, in a fifteenth possible implementation of the fourth aspect, the processor is further configured to: obtain an event ID from a first subscription management server, where the event ID is an event ID generated by a second subscription management server to download the subscription profile; send a subscription profile download request to the second subscription server, where the subscription profile download request carries the event ID and a second EID, so that the second subscription server determines to determine the authorization file based on the event ID and the second EID and sends the authorization file to the processor, where the second EID is an ID of the eUICC in the terminal; and receive the authorization file sent by the second subscription server.

With reference to the fifteenth possible implementation of the fourth aspect, in a sixteenth possible implementation of the fourth aspect, the processor is further configured to: receive a first EID and signature information that are sent by the second subscription server, where the first EID is an EID associated with the authorization file, and the signature information is generated based on the first EID and the authorization file; and verify whether the signature information is correct; and if the signature information is correct, determine whether the first EID is the same as the second EID; and if the first EID is the same as the second EID, send the authorization file to the eUICC.

With reference to the sixteenth possible implementation of the fourth aspect, in a seventeenth possible implementation of the fourth aspect, the eUICC is further configured to: after receiving and configuring the authorization file, send a response message to the processor, where the response message is used to indicate that the eUICC successfully configures the authorization file; and the processor is further configured to send the response message to the second subscription server, so that the second subscription server receives the response message and then sends the subscription profile to the processor.

With reference to the seventeenth possible implementation of the fourth aspect, in an eighteenth possible implementation of the fourth aspect, the processor is further configured to receive the subscription profile sent by the second subscription server.

According to a fifth aspect, a first subscription server is disclosed, including:

a processor, configured to: obtain a second EID by using a communications interface, where the second EID is an identifier ID of an integrated circuit card eUICC in a terminal; and determine an authorization file associated with the second EID, where the authorization file includes an identifier of at least one policy rule and forbidden-region information corresponding to each of the at least one policy rule; where the processor is further configured to send the authorization file to a processor of the terminal by using the communications interface, so that the processor of the terminal sends the authorization file to the eUICC to determine whether to install a subscription profile.

With reference to the fifth aspect, in a first possible implementation of the fifth aspect, the processor is further configured to obtain, by using the communications interface, signature information and a first EID that is associated with the authorization file, where the signature information is generated based on the first EID and the authorization file; and the processor is further configured to send the first EID and the signature information to the processor of the terminal by using the communications interface, so that the processor of the terminal sends the authorization file to the eUICC after verifying that the signature information is correct and determining that the first EID is the same as the second EID.

According to a sixth aspect, a second subscription management server is disclosed, including:

a processor, configured to: obtain an event identifier ID and a second EID from a terminal by using a communications interface, where the event ID is an event ID generated by the second subscription server for the terminal to download a subscription profile, and the second EID is an ID of an integrated circuit card eUICC in the terminal; determine, based on the event ID and the second EID, a subscription profile that matches the second EID, and determine whether there is an authorization file associated with the subscription profile; and if there is an authorization file associated with the subscription profile, send, by using the communications interface, the authorization file associated with the subscription profile to a processor of the terminal, so that the processor of the terminal sends the authorization file to the eUICC in the terminal to determine whether to install the subscription profile.

With reference to the sixth aspect, in a first possible implementation of the sixth aspect, the processor is specifically configured to: determine a subscription profile associated with the event ID; determine whether a first EID associated with the subscription profile is the same as the second EID; and if the first EID is the same as the second EID, determine that the subscription profile is a subscription profile that matches the eUICC.

With reference to the sixth aspect, in a second possible implementation of the sixth aspect, the processor is specifically configured to: determine a subscription profile associated with the second EID; determine whether an event ID associated with the subscription profile is the same as the event ID; and if the event ID associated with the subscription profile is the same as the event ID, determine that the subscription profile is a subscription profile that matches the eUICC.

With reference to the sixth aspect or the first or the second possible implementation of the sixth aspect, in a first possible implementation of the sixth aspect, the processor is further configured to: generate the subscription profile for the terminal, and generate the event ID; and the processor is further configured to register the event ID and the second EID with a first subscription management server by using the communications interface, so that the terminal obtains the event ID from the first subscription management server.

According to a seventh aspect, a method for installing a subscription profile is disclosed. An authorization file is preconfigured in the terminal, the authorization file includes a first policy rule option, the first policy rule option includes an identifier of a first policy rule and a region in which use of the first policy rule is forbidden, and the method includes:

the terminal obtains metadata of the subscription profile, where the metadata includes the first policy rule and an identifier of an operator corresponding to the subscription profile, and the identifier of the operator corresponding to the subscription profile indicates a region to which the operator corresponding to the subscription profile belongs;

the terminal determines whether the region to which the operator corresponding to the subscription profile belongs is within the region in which the use of the first policy rule is forbidden; and if the region to which the operator corresponding to the subscription profile belongs is within the region in which the use of the first policy rule is forbidden, the terminal refuses to install the subscription profile.

With reference to the seventh aspect, in a first possible implementation of the seventh aspect, the first policy rule option further includes information about an operator that is allowed to use the first policy rule and information about whether the use of the first policy rule requires user consent.

With reference to the first possible implementation of the seventh aspect, in a second possible implementation of the seventh aspect, the method further includes:

if the region to which the operator corresponding to the subscription profile belongs is out of the region in which the use of the first policy rule is forbidden, the operator corresponding to the subscription profile belongs to the operator that is allowed to use the first policy rule, and the use of the first policy rule does not require user consent or a user agrees to use the first policy rule, the terminal installs the subscription profile.

With reference to the seventh aspect or the first or the second possible implementation of the first aspect, in a third possible implementation of the seventh aspect, before or after the terminal obtains the metadata of the subscription profile, the method further includes:

the terminal obtains a new authorization file, where the new authorization file includes a second policy rule option and a management indicator, and the second policy rule option includes the identifier of the first policy rule and at least one piece of the following information:

a new region in which the use of the first policy rule is forbidden, and a new operator that is allowed to use the first policy rule; and when the management indicator is addition, the terminal adds the second policy rule option to the authorization file, or adds the at least one piece of the information to the first policy rule option. In other words, after the new authorization file is obtained, if a policy rule option in the new authorization file includes an identifier of a policy rule, and a management indicator corresponding to the identifier of the policy rule in the policy rule option is addition, the terminal adds the policy rule option to an existing authorization file, or adds new information to the policy rule option in which the policy rule is located in an existing authorization file.

With reference to the seventh aspect or the first or the second possible implementation of the first aspect, in a fourth possible implementation of the seventh aspect, before or after the terminal obtains the metadata of the subscription profile, the method further includes:

the terminal obtains a new authorization file, where the new authorization file includes a second policy rule option and a management indicator, and the second policy rule option includes the identifier of the first policy rule and at least one piece of the following information:

a region in which the use of the first policy rule is forbidden, and an operator that is allowed to use the first policy rule; and when the management indicator is deletion, the terminal deletes the at least one piece of the information from the first policy rule option in the authorization file. In other words, after the new authorization file is obtained, if a policy rule option in the new authorization file includes an identifier of a policy rule, and a management indicator corresponding to the identifier of the policy rule in the policy rule option is deletion, the terminal deletes duplicate information between the new authorization file and an existing authorization file from the policy rule option in which the policy rule is located in the existing authorization file.

With reference to any one of the seventh aspect or the first to the fourth possible implementations of the first aspect, in a fifth possible implementation of the seventh aspect, the first policy rule is not allowing deactivating a subscription profile or not allowing deleting a subscription profile.

According to an eighth aspect, a terminal is disclosed. An authorization file is preconfigured in the terminal, the authorization file includes a first policy rule option, the first policy rule option includes an identifier of a first policy rule and information about a region in which use of the first policy rule is forbidden, and the terminal includes:

a processor, configured to obtain metadata of the subscription profile, where the metadata includes the first policy rule and an identifier of an operator corresponding to the subscription profile, and the identifier of the operator corresponding to the subscription profile indicates a region to which the operator corresponding to the subscription profile belongs where the processor is further configured to determine whether the region to which the operator corresponding to the subscription profile belongs is within the region in which the use of the first policy rule is forbidden; and an integrated circuit card eUICC, configured to: when the processor determines that the region to which the operator corresponding to the subscription profile belongs is within the region in which the use of the first policy rule is forbidden, refuse to install the subscription profile.

With reference to the eighth aspect, in a first possible implementation of the eighth aspect, the first policy rule option further includes information about an operator that is allowed to use the first policy rule and information about whether the use of the first policy rule requires user consent.

With reference to the first possible implementation of the eighth aspect, in a second possible implementation of the eighth aspect, the eUICC is further configured to: when the processor determines that the region to which the operator corresponding to the subscription profile belongs is within the region in which the use of the first policy rule is forbidden, the operator corresponding to the subscription profile belongs to the operator that is allowed to use the first policy rule, and the use of the first policy rule does not require user consent or a user agrees to use the first policy rule, install the subscription profile.

With reference to the eighth aspect or the first or the second possible implementation of the eighth aspect, in a third possible implementation of the eighth aspect, the eUICC is further configured to: before or after the processor obtains the metadata of the subscription profile, obtain a new authorization file, where the new authorization file includes a second policy rule option and a management indicator, and the second policy rule option includes the identifier of the first policy rule and at least one piece of the following information:

a new region in which the use of the first policy rule is forbidden, and a new operator that is allowed to use the first policy rule; and when the management indicator is addition, add, by the eUICC, the second policy rule option to the authorization file, or add the at least one piece of the information to the first policy rule option.

With reference to the eighth aspect or the first or the second possible implementation of the eighth aspect, in a fourth possible implementation of the eighth aspect, the eUICC is further configured to: before or after the processor obtains the metadata of the subscription profile, obtain a new authorization file, where the new authorization file includes a second policy rule option and a management indicator, and the second policy rule option includes the identifier of the first policy rule and at least one piece of the following information:

a region in which the use of the first policy rule is forbidden, and an operator that is allowed to use the first policy rule; and when the management indicator is deletion, delete, by the eUICC, the at least one piece of the information from the first policy rule option in the authorization file.

With reference to any one of the eighth aspect or the first to the fourth possible implementations of the eighth aspect, in a fifth possible implementation of the eighth aspect, the first policy rule is not allowing deactivating a subscription profile or not allowing deleting a subscription profile.

BRIEF DESCRIPTION OF DRAWINGS

FIG. 7A, FIG. 7B, FIG. 7C, and FIG. 7D are a schematic flowchart of a method for installing a subscription profile according to an embodiment of the present invention;

DESCRIPTION OF EMBODIMENTS

Figure 1:
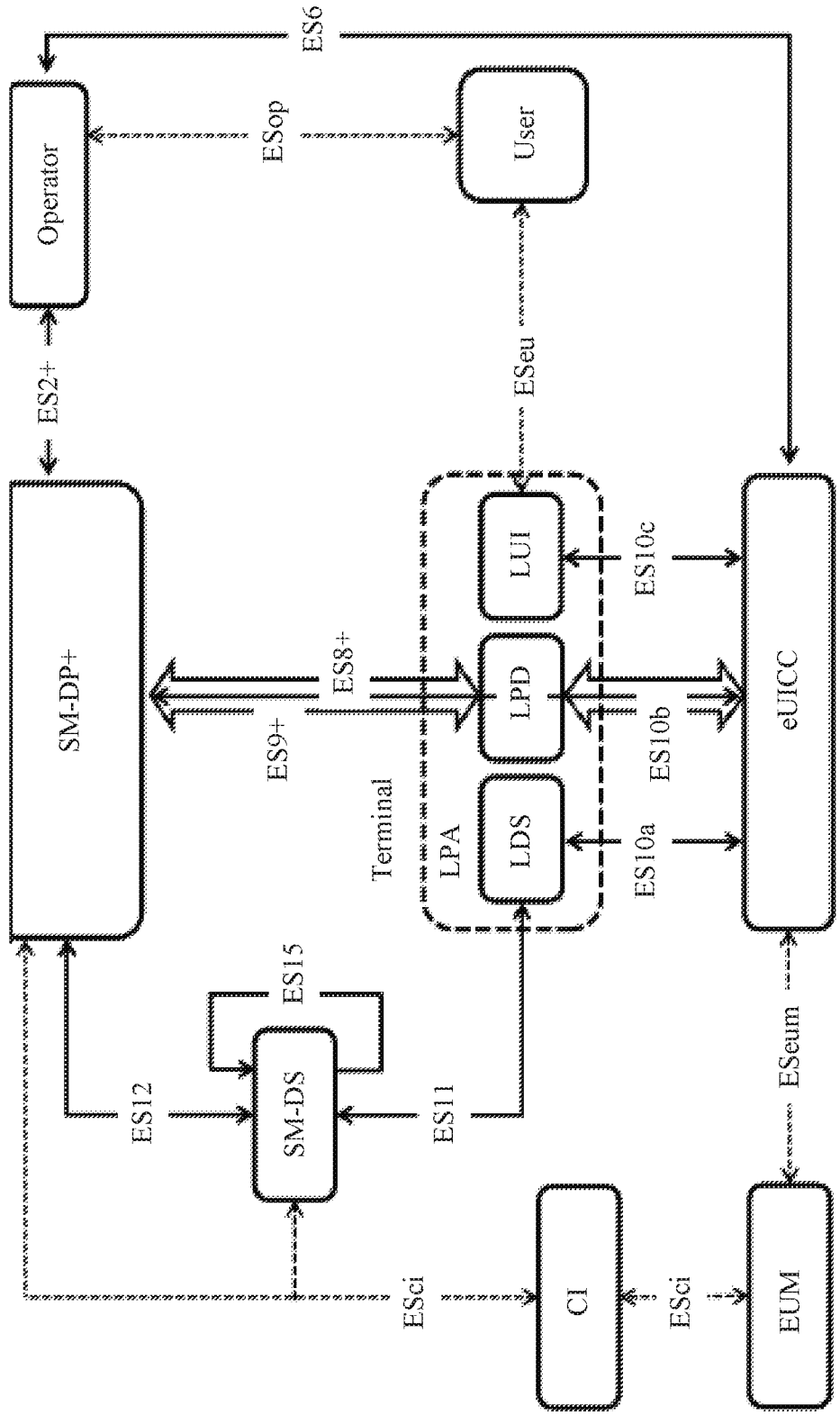
FIG. 1 is an architectural diagram of a remote management system of an eUICC according to an embodiment of the present invention.

An existing SIM card or a UICC card is usually subscribed in a centralized manner from a card manufacturer by an MNO (mobile network operator, mobile network operator). Therefore, a network access application and data that are required for accessing a network of the operator have been downloaded to the card before the card leaves a factory, for example, a USIM (Universal Subscriber Identity Module, universal subscriber identity module), an IMSI (International Mobile Subscriber Identity, international mobile subscriber identity), and a KI (Key Identity, key identity). In this case, after purchasing the SIM card or the UICC card, a user can access the network of the operator simply by inserting the SIM card or the UICC card into a terminal (device).

Different from the UICC card, an eUICC is usually a UICC card embedded into the terminal. The eUICC is not necessarily purchased by the operator from the card manufacturer, but may be purchased and then integrated into the terminal by a terminal manufacturer. Therefore, after the eUICC leaves a factory, the eUICC may not include data that allows access to the network of the operator, and the data such as a subscription profile (profile, to be specific, a set of data and an application program that are configured in the eUICC to provide a service) needs to be downloaded remotely, so that the eUICC can access the network of the operator based on the data. Generally, the subscription profile includes policy rules (policy rules).

In addition, a RAT is currently preconfigured in the eUICC in the terminal, and the RAT limits a rule with which the operator needs to comply when setting the policy rules.

An existing RAT is shown in Table 1 and includes a plurality of policy rule options. Each policy rule option includes an identifier of a policy rule and applicable-operator information and user authorization information (to be specific, whether setting of the policy rule requires user consent, and may be "Yes" or "No") that are corresponding to the policy rule.

TABLE 1

| PPR ID (Policy rule identifier) | Allowed operators (Applicable-operator information) | End user consent required (Whether user consent is required, in other words, user authorization information) |
| --- | --- | --- |
| PPR 1 | OP-A | No (Not required) |
| PPR 1 | * | Yes (Required) |
| PPR 2 | * | Yes |
| PPR 3 | OP-B | Yes |

In Table 1, "*" indicates that all operators are applicable. If the RAT does not include an identifier of a policy rule, in other words, the RAT does not define the policy rule, it indicates that all operators are forbidden from setting the policy rule.

According to Table 1, for an operator A, use of the PPR 1 (to be specific, a policy rule 1) does not require user consent, the PPR 2 can be used when user consent is obtained, and the PPR 3 cannot be used.

It can be learned that the RAT table defined in the prior art lists a whitelist of allowed operators, and either all operators are allowed or a specific operator is allowed. However, there is the following case if use of one or more policy rules needs to be forbidden in some regions, according to an existing RAT setting method, an only solution is not to define these policy rules in the RAT. However, in this case, these policy rules not only cannot be used in the regions, but also cannot be used in other regions. Consequently, the terminal cannot be delivered globally, but can use the specific policy rules only in these specific regions. Alternatively, a whitelist of all operators other than operators in the regions is configured in the RAT. However, because there are thousands of operators in the globe, it is unpractical to configure all operators in the RAT list.

In addition, in the prior art, the RAT is preconfigured in the eUICC in the terminal. However, a procedure for downloading the RAT to the eUICC is not defined, and no procedure for updating the RAT in the terminal is related.

In the embodiments of the present invention, a new field, to be specific, forbidden-region information, is added to the existing RAT, to limit use of a policy rule by an operator in a specific region. In addition, specific procedures for downloading and updating the RAT by the terminal are provided. Specifically, an LPA (Local Profile Assistant, local profile assistant) in the terminal obtains the RAT, and sends the RAT to the eUICC in the terminal, and then the LPA and the eUICC sequentially verify, based on applicable-operator information, applicable-condition information, and forbidden-region information of each policy rule recorded in the RAT, whether the policy rule in a downloaded subscription profile is allowed, in other words, verify whether the subscription profile can be installed.

First, a system, terms, and the like related to the present invention are described below.

I. FIG. 1 is an architectural diagram of a remote management system of an eUICC according to an embodiment of the present invention. Referring to FIG. 1, the system includes an SM-DP+ (Subscription Manager-Data Preparation+, subscription manager-data preparation) server, an SM-DS (Subscription Manager-Discovery Server, subscription manager-discovery server), an operator (Operator), a card manufacturer (EUM), a certificate issuer CI (Certificate Issuer), and a user (End User).

In addition, interfaces between entities are described: An ES6 and an ES2+ are interfaces between the eUICC and the operator; an ES8+ is an interface between the eUICC and the SM-DP+; an ES11 is an interface between an LDS (local discovery service, local discovery service) of a terminal and the SM-DS; an ES12 is an interface between the SM-DS and the SM-DP+; an ES10a is an interface between the LDS and the eUICC; an ES10c is an interface between an LUI (local user interface, local user interface) and the eUICC; an ESci is an interface between the EUM and the CI, or is an interface between the CI and the SM-DP+; an ESeum is an interface between the EUM and the eUICC; an ESo is an interaction interface between the user (End User) and the operator; an ESeu is an interface between the end user and the LUI; an ES9+ is an interface between the SM-DP+ and an LPD (local profile download, local profile download); and an ES10b is an interface between the LPD and the eUICC.

The SM-DP+ includes the following functions: generating a subscription profile (profile), protecting (for example, encrypting) the subscription profile, storing the subscription profile, binding the subscription profile (for example, binding the profile to an event (event) ID), sending the subscription profile, remotely managing the subscription profile, notifying the SM-DS, and the like. The SM-DS is mainly responsible for accepting registration of an event (Event) sent by the SM-DP+, and sending the event to the terminal. The event includes a subscription profile download event or a subscription profile management event. The terminal downloads the subscription profile from the SM-DP+ based on the subscription profile download event, or the terminal responds to the subscription profile management event to obtain a subscription profile management command from the SM-DP+.

Further, referring to FIG. 1, the terminal includes the LPA and the eUICC, and the LPA includes the LDS, the LPD, and the LUI. In specific implementation, the LDS in the terminal searches the SM-DS for an event, and the LPD is responsible for downloading a subscription profile. To be specific, the LPD downloads the profile from the SM-DP+ to the LPD by using an HTTPS (Hypertext Transfer Protocol Secure, Hypertext Transfer Protocol) Secure link, and then sends the downloaded subscription profile to the eUICC by using a local APDU command. The subscription profile herein is a set of a file structure, data, an application program, and the like, and may include one or more network access applications and corresponding network access credentials. It should be noted that in this embodiment of the present invention, the subscription profile is a general term and includes a subscription profile installed on the eUICC in the terminal and a profile package stored in the SM-DP+.

In addition, the LUI in the terminal provides user interaction logic and interface. A user may manage a profile by using the LUI, for example, download a new profile, activate a profile, deactivate a profile, or delete a profile.

II. Table 2 shows several examples of policy rules defined in an existing GSMA RST standard, and specifically includes:

TABLE 2

| | |
|---|---|
| POL RULE1 (policy rule 1) | The Profile Policy Rule 'Disabling of this Profile is not allowed' SHALL be supported. (Deactivation of a subscription profile including the policy rule 1 is not allowed.) |
| POL RULE2 (policy rule 2) | The Profile Policy Rule 'Deletion of this Profile is not allowed' SHALL be supported. (Deletion of a subscription profile including the policy rule 2 is not allowed.) |
| POL RULE3 (policy rule 3) | The Policy Rule 'Deletion of this Profile is required upon its successful disabling' SHALL be supported. (After a subscription profile including the policy rule 3 is deactivated, the subscription profile needs to be deleted.) |

If a subscription profile includes the foregoing policy rules, when managing the subscription profile profile, the eUICC determines, based on the policy rules, whether a requested subscription profile management operation can be performed. For example, if the subscription profile includes the policy rule 1, to be specific, deactivation (disabling) of the subscription profile is not allowed, when a user requests to deactivate the subscription profile, the eUICC rejects the request of the user, and returns error information.

In conclusion, because a policy rule limits subscription profile management performed by a user, when downloading a subscription profile including a policy rule, the eUICC needs to determine, based on the policy rule included in the subscription profile and by referring to the RAT, whether an operator corresponding to the subscription profile is allowed to download the subscription profile. For example, the eUICC obtains metadata of a subscription profile B, and if the subscription profile B includes a policy rule A (a subscription profile including the policy rule A may be downloaded), the eUICC first determines an operator C corresponding to the subscription profile B, and then view a RAT to check whether the policy rule A is defined. If the RAT defines the policy rule A and allows the operator C to configure the policy rule A, in other words, the operator C is allowed to download the subscription profile including the policy rule A, for example, the subscription profile B, the eUICC downloads the subscription profile B.

Embodiment 1

Figure 2:
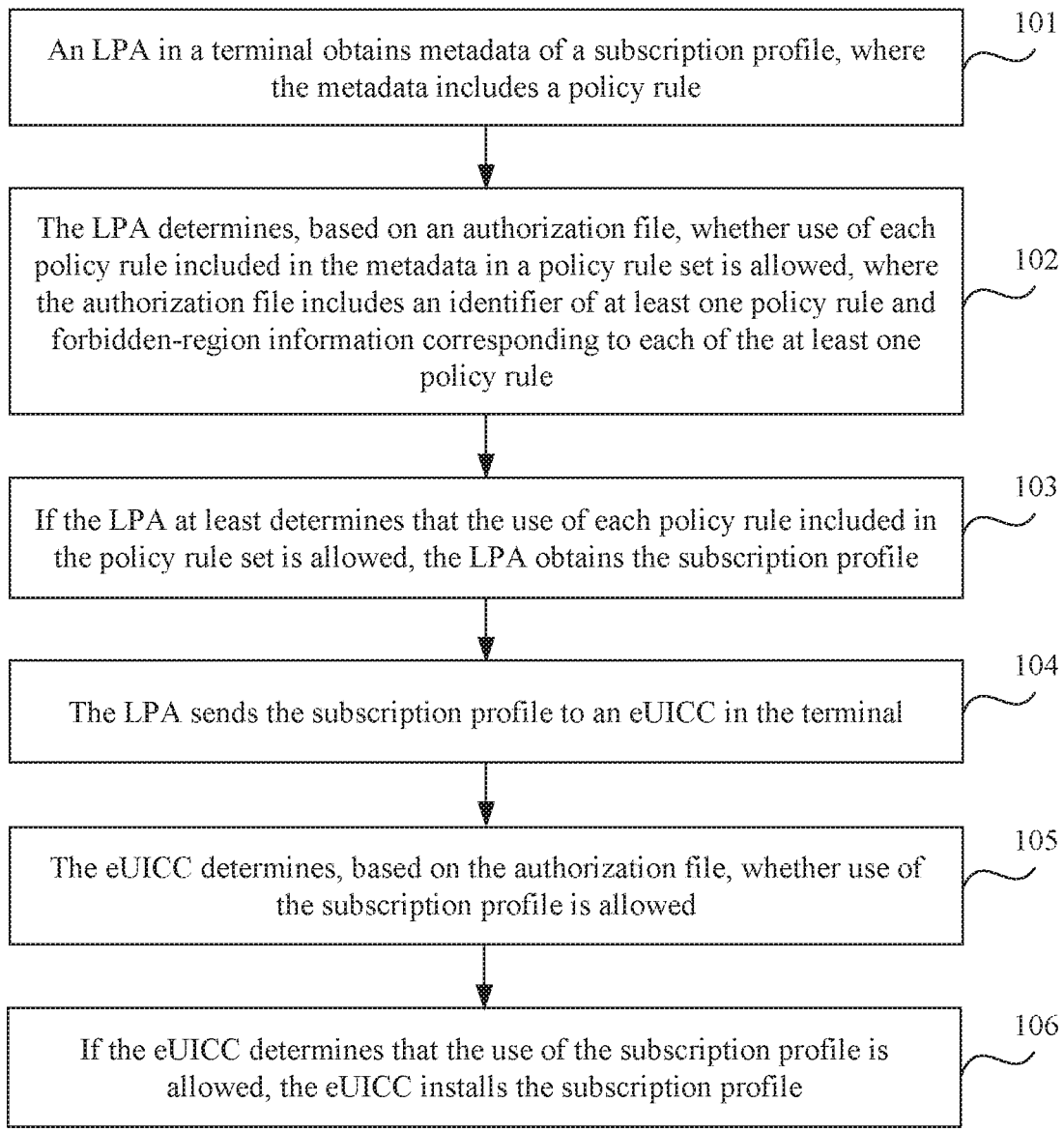
FIG. 2 is a schematic flowchart of a method for installing a subscription profile according to an embodiment of the present invention.

This embodiment of the present invention provides a method for installing a subscription profile. As shown in FIG. 2, the method includes the following steps.

101. An LPA in a terminal obtains metadata of a subscription profile, where the metadata includes a policy rule.

The subscription profile herein may be a profile, and the metadata may be metadata. Generally, a subscription profile includes metadata, and the metadata includes a policy rule. In this embodiment of the present invention, "a policy rule in a subscription profile (or profile)" is a policy rule in metadata included in the subscription profile.

The metadata may be delivered by an SM-DP+ to the LPA. In specific implementation, the SM-DP+ may first deliver the metadata, and then deliver the subscription profile after verifying, based on the metadata, that use of each of the policy rule included in the subscription profile is allowed. Alternatively, the subscription profile may be directly delivered and include the metadata, and likewise, there is a need to verify, based on the metadata, that use of each of the policy rule included in the subscription profile is allowed.

102. The LPA determines, based on an authorization file, whether use of each policy rule included in the metadata is allowed, where the authorization file includes an identifier of at least one policy rule and forbidden-region information corresponding to each of the at least one policy rule.

It should be noted that the authorization file herein may be a RAT, and usually may be preconfigured in the terminal, or may be obtained from the SM-DP+ by the LPA. A specific procedure is not described in detail herein, and is described in detail in a subsequent embodiment. In addition, the authorization file further includes a management indicator, user authorization information, and applicable-operator information of each of the at least one policy rule.

For each of the at least one policy rule, the user authorization information indicates whether setting of the policy rule requires user consent; and the applicable-operator information is information about an operator that is allowed to use the policy rule.

103. If the LPA at least determines that the use of each policy rule included in the policy rule set is allowed, the LPA obtains the subscription profile.

The policy rule included in the subscription profile is the same as the policy rule included in the metadata. In specific implementation, after the LPA uses the RAT (in other words, the authorization file) to verify that the use of each policy rule in the policy rule set included in the subscription profile is allowed, to be specific, the policy rules may be set in the profile, the LPA may request a user to enter confirmation code required for downloading the subscription profile, or the LPA may request a user to agree to continue to download the subscription profile. After the user enters correct confirmation code or the user agrees to continue the download, the LPA downloads the subscription profile from the SM-DP+.

If user consent is not obtained in the foregoing process, after obtaining the subscription profile, the LPA needs to obtain user consent (agreeing to set the policy rule and agreeing to download the subscription profile), and then the LPA sends the subscription profile to an eUICC.

104. The LPA sends the subscription profile to an eUICC in the terminal.

105. The eUICC determines, based on the authorization file, whether use of the subscription profile is allowed.

106. If the eUICC determines that the use of the subscription profile is allowed, the eUICC installs the subscription profile.

In specific implementation, the LPA sends the profile to the eUICC section by section: first sends some information used for key negotiation, then sends the metadata, and finally sends the subscription profile. If the eUICC verifies that the policy rule in the metadata fails, the eUICC does not continue to receive the subscription profile subsequently sent by the LPA.

Figure 3:
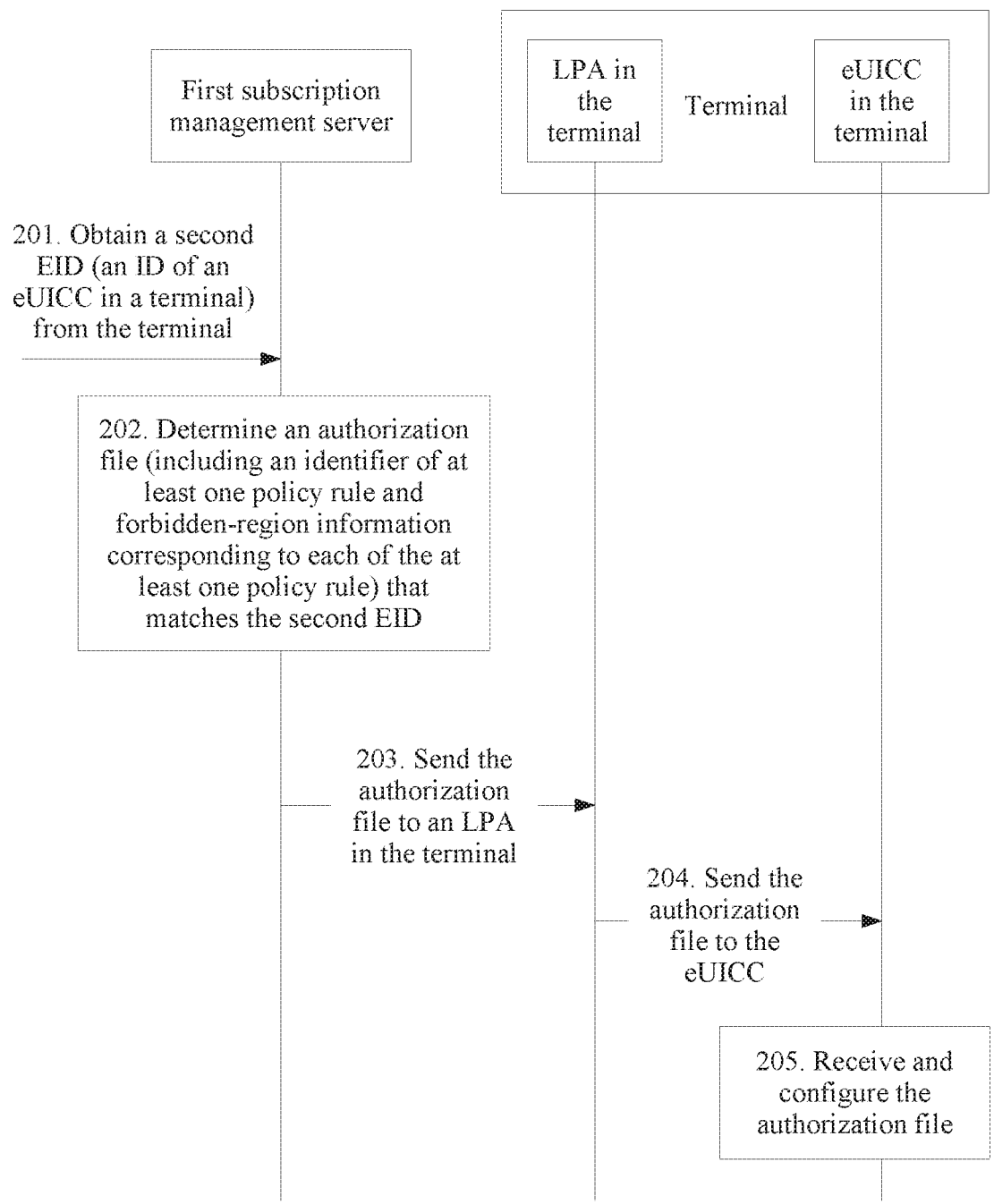
FIG. 3 is a schematic flowchart for configuring an authorization file according to an embodiment of the present invention.

Further, how the LPA and the eUICC in the terminal obtain the authorization file RAT is described in detail. As shown in FIG. 3, the following steps are specifically included.

201. A first subscription management server obtains a second EID.

The first subscription management server herein may be the SM-DS in the system shown in FIG. 1 or an SM-SR+, and may be collectively referred to as an SM-XX herein. The second EID is an ID of the eUICC in the terminal.

In specific implementation, before step 201, the operator requests the SM-DP+ to generate a profile for the terminal. After generating the profile, the SM-DP+ generates an event ID for an event "Downloading a profile" of the terminal, and then the SM-DP+ sends the second EID (in other words, the ID of the eUICC in the terminal) and an event record (including the event ID and address information of the SM-DP+) to the SM-XX, so that the SM-XX registers the event ID, and associates the event ID with the EID. In addition, the SM-XX receives the authorization file and a first EID associated with the authorization file, and may further receive an event ID associated with the authorization file.

When the terminal is initialized, the terminal sends a polling (polling) message to the SM-XX based on an SM-XX address preconfigured in the terminal. The polling message carries the EID. In this way, the first subscription management server SM-XX obtains the ID of the eUICC in the terminal.

202. The first subscription management server determines an authorization file that matches the second EID, where the authorization file includes an identifier of at least one policy rule and forbidden-region information corresponding to each of the at least one policy rule.

Referring to Table 3, the authorization file RAT provided in this embodiment of the present invention is different from the existing RAT shown in Table 1 as follows: A new field, forbidden-region information (forbidden area), is added to a policy rule option in the RAT, and regions in which a policy rule cannot be used are defined. Optionally, another new field is added, to be specific, a management indicator (management operation), to indicate that, when the RAT is updated, there is a need to add or remove all information (an identifier of the policy rule, and applicable-operator information and user authorization information that are corresponding to the policy rule) corresponding to the PPR.

authorization file. Therefore, after obtaining an EID, the SM-XX may obtain an associated event ID based on the EID, and then may obtain an associated authorization file based on the event ID.

203. The first subscription management server sends the authorization file to an LPA in the terminal.

In specific implementation, the first subscription management server SM-XX sends the authorization file, the first EID associated with the authorization file, the event record, and signature information to the LPA in the terminal. The signature information herein is obtained after the first EID and the authorization file are signed.

In addition, if there is an event record associated with the authorization file, the SM-XX may first send the authorization file and then send the event record.

204. The LPA sends the authorization file to the eUICC.

In specific implementation, the LPA verifies whether the signature information is correct, and if the signature information is correct, the LPA verifies whether the second EID received in step 201 is the same as the first EID, in other words, determines whether the received authorization file is generated for the terminal by an OEM. If the received first EID is the same as the second EID, the LPA sends the authorization file to the eUICC in the terminal.

205. The eUICC receives and configures the authorization file.

In specific implementation, if there is no local authorization file in the eUICC, the eUICC stores the authorization

TABLE 3

| PPR ID (Policy rule identifier) | Allowed operators (Applicable-operator information) | End user consent required (User authorization information) | Forbidden area (Forbidden-region information) | Management operation (Management indicator) |
|---|---|---|---|---|
| PPR 1 (policy rule 1) | OP-A (Operator A) | No (No) | 460 | Add (Add) |
| PPR 2 (policy rule 2) | OP-B (Operator B) | Yes (Yes) | Null (Null) | Remove (Remove) |

Referring to Table 3, the forbidden-region information may be indicated by an MCC (Mobile Country Code, mobile country code). A resource of the MCC is uniformly allocated and managed by the International Telecommunication Union (ITU), uniquely identifies a country or a region to which a mobile user belongs, and includes three characters. For example, an MCC of China is 460. The MCC is a country code. An operator in a country or a region may be blocked based on an MCC.

In addition, an ID of an operator (MNO ID) in this embodiment of the present invention may be MCC+MNC. The MCC is an MCC of a country in which the operator is located. The MNC (Mobile Network Code, mobile network code) is a unique identification code of the operator in the country to which the operator belongs, and includes two characters. For example, 00 is used for a TD system of China Mobile, 01 is used for a GSM system of China Unicom, 02 is used for a GSM system of China Mobile, and 03 is used for a CDMA system of China Telecom.

Certainly, the operator ID may further include other suffixes in addition to MCC+MNC. This is not limited herein.

Referring to the detailed description of step 1, the first subscription management server SM-XX may associate the event ID with the EID, and the SM-XX may further receive the authorization file and the event ID associated with the file; or if there is an existing authorization file in the eUICC, the eUICC updates the local existing authorization file based on the authorization file.

Further, that the eUICC updates the local existing authorization file based on the authorization file specifically includes:

for each of the at least one policy rule, if the management indicator of the policy rule in the authorization file is addition, the eUICC adds the policy rule, the user authorization information of the policy rule, the applicable-operator information of the policy rule, and the forbidden-region information of the policy rule to the local existing authorization file; or for each of the at least one policy rule, if the management indicator of the policy rule in the authorization file is removal, user authorization information of the policy rule in the local existing authorization file is the user authorization information, applicable-operator information of the policy rule in the local existing authorization file is the applicable-operator information, and forbidden-region information of the policy rule in the local existing authorization file is the forbidden-region information, the eUICC deletes, from the local existing authorization file, the policy rule and the user authorization information, the applicable-operator information, and the forbidden-region information that are corresponding to the policy rule; or if the management indicator of the policy rule in the authorization file is removal, applicable-operator information of the policy rule in the local existing authorization file includes the applicable-operator information and operator information other than the operator information, user authorization information of the policy rule in the local existing authorization file includes at least the user authorization information, and forbidden-region information of the policy rule in the local existing authorization file includes at least the forbidden-region information, the eUICC deletes the applicable-operator information from the applicable-operator information of the policy rule in the local existing authorization file; or if the management indicator of the policy rule in the authorization file is removal, user authorization information of the policy rule in the local existing authorization file includes the user authorization information and user authorization information other than the user authorization information, applicable-operator information of the policy rule in the local existing authorization file includes at least the applicable-operator information, and forbidden-region information of the policy rule in the local existing authorization file includes at least the forbidden-region information, the eUICC deletes the user authorization information from the user authorization information of the policy rule in the local existing authorization file; or if the management indicator of the policy rule in the authorization file is removal, forbidden-region information of the policy rule in the local existing authorization file includes the first forbidden-region information and forbidden-region information other than the forbidden-region information, applicable-operator information of the policy rule in the local existing authorization file includes at least the applicable-operator information, and user authorization information of the policy rule in the local existing authorization file includes at least the user authorization information, the eUICC deletes the forbidden-region information from the forbidden-region information of the policy rule in the local existing authorization file.

Figure 4:
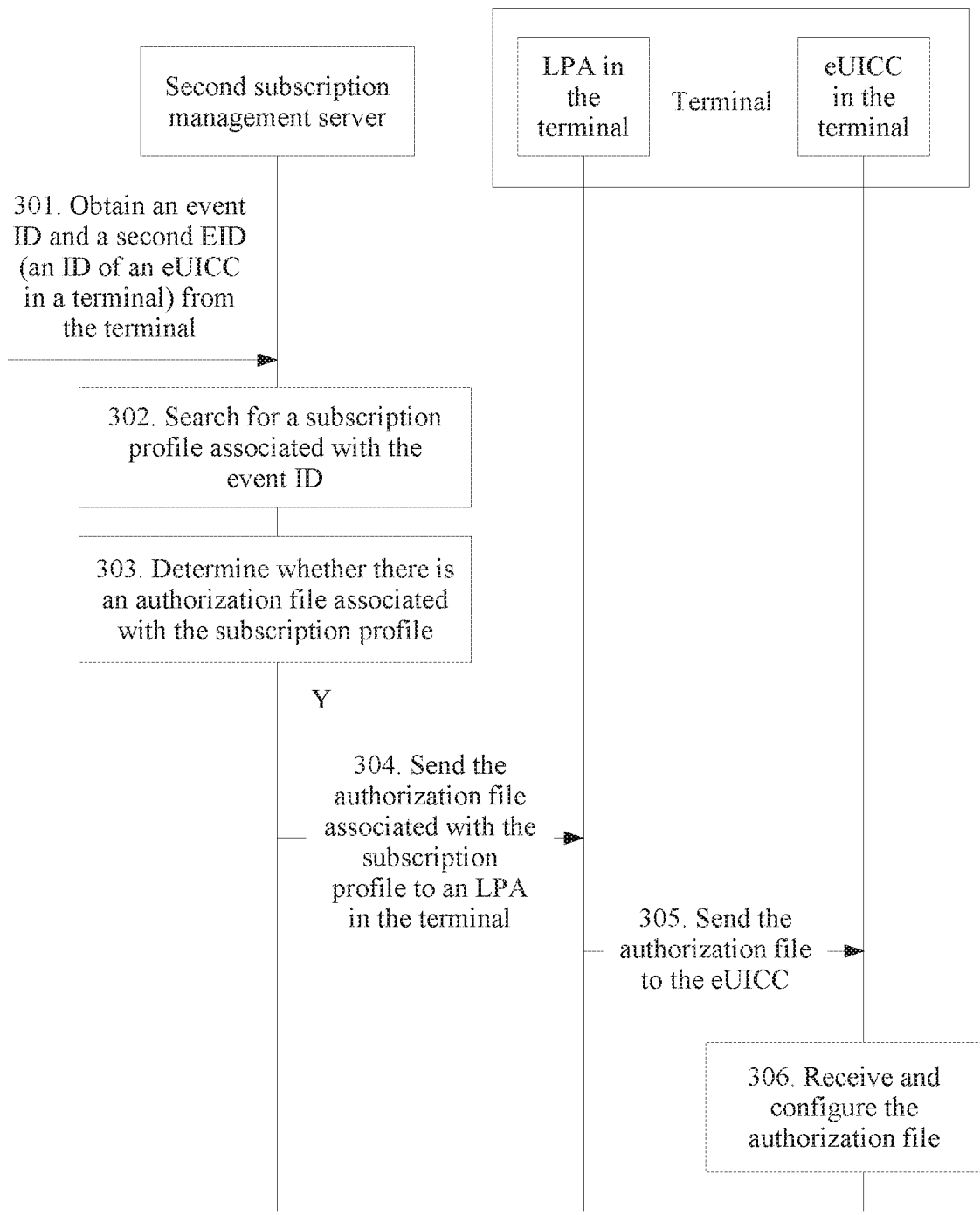
FIG. 4 is another schematic flowchart for configuring an authorization file according to an embodiment of the present invention.

In this embodiment of the present invention, the LPA and the eUICC may alternatively obtain the authorization file in the following manner. Different from the foregoing method (steps 201 to 205) provided in this embodiment, in this method, the RAT is no longer downloaded from the first subscription management server SM-XX, but is downloaded from a second subscription management server SM-DP+ to the terminal. As shown in FIG. 4, the method mainly includes the following steps.

301. The second subscription management server obtains an event ID and a second EID from a terminal.

In specific implementation, before step 301, the second subscription management server SM-DP+ generates the profile for an eUICC in the terminal, generates an event "Downloading a profile" for the terminal for downloading a subscription profile, and generates an event ID of the event. The second EID herein is an ID of the eUICC in the terminal.

In addition, the SM-DP+ registers the event ID and the ID of the eUICC in the terminal with the first subscription management server SM-XX, and associates the second EID and the event ID.

In this way, when the terminal is initialized, the terminal initiates polling (which carries the second EID) to an SM-DS based on an SM-DS address preconfigured in the terminal, to perform two-way authentication with the SM-DS. Then, the SM-DS searches for the associated event ID based on the second EID, and sends an event record (including the event ID and information about the SM-DP+) to the terminal. In this way, the terminal may communicate with the SM-DP+ based on the information about the SM-DP+ in the event record, to perform the two-way authentication. Then, the terminal may send the event ID and the second EID to the SM-DP+.

302. The second subscription server searches for a subscription profile associated with the event ID.

Generally, the SM-DP+ may receive the EID (the second EID) of the terminal, an authorization file, signature information, and the like provided by an MNO, and then respond to a request of the MNO to generate a profile for the EID. Then, the SM-DP+ may further associate the subscription profile with the EID. Therefore, the second subscription server may find a subscription profile based on the event ID and the second EID that are obtained in step 301.

In practice, the SM-DP+ only generates a subscription profile for an EID, and then checks, through comparison, whether the EID (the second EID) sent by the terminal is the same as an EID (a first EID) associated with the subscription profile, to determine whether the subscription profile determined in step 302 is a profile customized for the terminal.

303. The second subscription server determines whether there is an authorization file associated with the subscription profile.

If there is an authorization file (in other words, a RAT) associated with the subscription profile, step 304 is to be performed.

304. The second subscription server sends the authorization file associated with the subscription profile to an LPA in the terminal.

Specifically, the second subscription server sends the authorization file, the EID associated with the authorization file, the signature information, and the like to the LPA in the terminal.

305. The LPA sends the authorization file to an eUICC in the terminal.

For a specific step, refer to the detailed description of step 204 in Embodiment 1. Details are not described herein again.

306. The eUICC receives and configures the authorization file.

For a specific step, refer to the detailed description of step 205 in Embodiment 1. Details are not described herein again.

Figure 5:
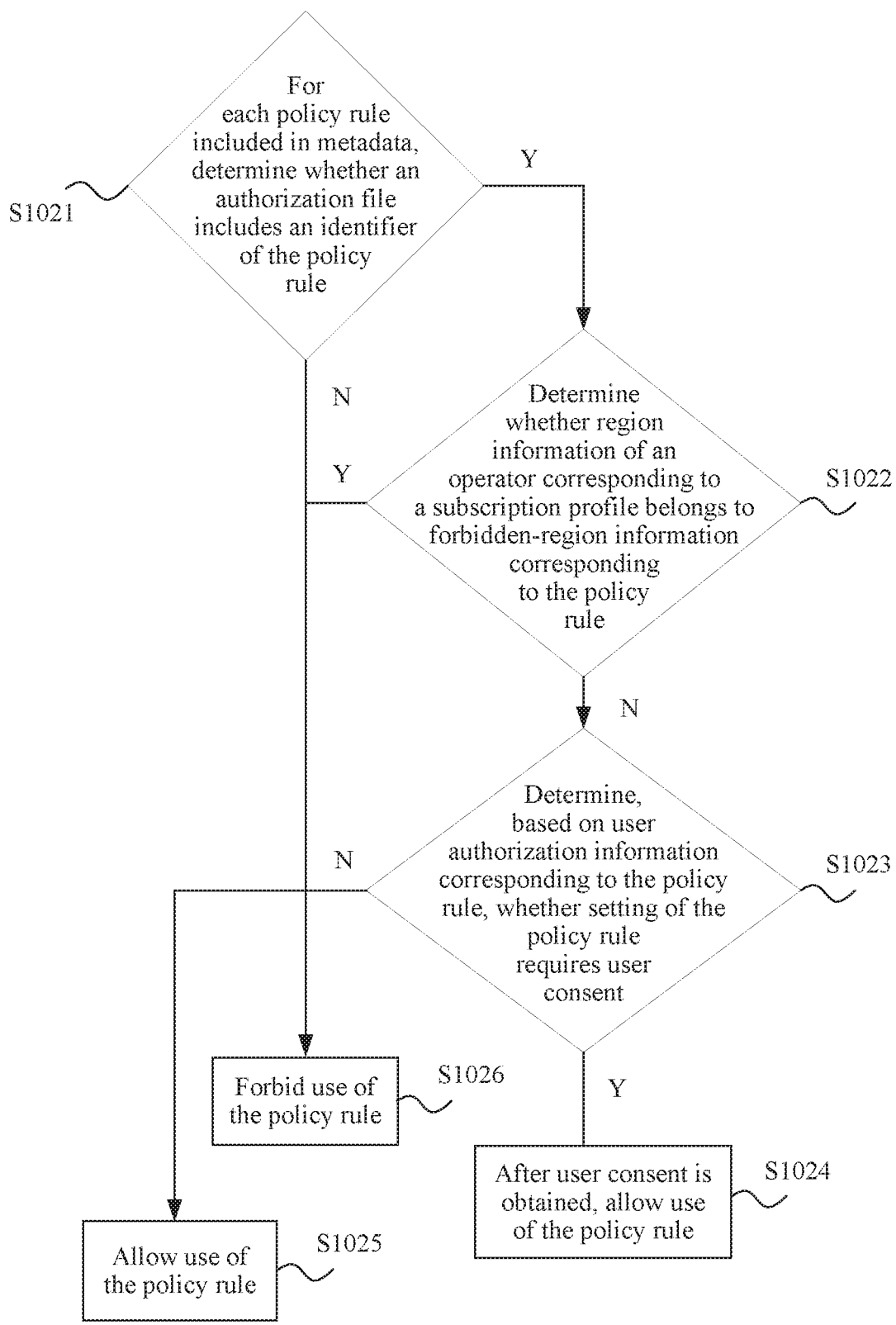
FIG. 5 is a schematic flowchart for determining, by an LPA, whether use of a subscription profile is allowed according to an embodiment of the present invention.

In another embodiment of the present invention, after step 205 or step 306, the LPA in the terminal downloads the subscription profile, the LPA and the eUICC sequentially determine whether use of each policy rule included in the subscription profile is allowed. As shown in FIG. 5, that the LPA determines whether the use of each policy rule included in the subscription profile is allowed includes the following steps.

S1021. For each policy rule included in the metadata, determine whether the authorization file includes an identifier of the policy rule.

The metadata (metadata) is metadata of a to-be-obtained subscription profile, and is the same as policy rules included in the subscription profile.

If it is determined that the authorization file includes the identifier of the policy rule, step S1022 is to be performed; or if it is determined that the authorization file does not include the identifier of the policy rule, use of the policy rule is not allowed, and therefore step S1026 is to be performed.

S1022. Determine whether region information of an operator corresponding to the subscription profile belongs to forbidden-region information corresponding to the policy rule.

Specifically, the forbidden-region information in this embodiment of the present invention may be an MCC, and the MCC includes three characters. In addition, applicable-operator information in this embodiment of the present invention may be an ID of an operator (MNO ID), and specifically may be MCC+MNC. The MCC is an MCC of a country in which the operator is located. The MNC is a unique identification code of the operator in the country to which the operator belongs, and includes two characters. First three characters in the ID of the operator are the MCC of the country in which the operator is located. Herein, it may be determined that the first three characters in the ID of the operator are the same as the characters corresponding to the forbidden-region information. For example, forbidden-region information corresponding to a policy rule PPR 1 is 046, and if an operator ID indicated by applicable-operator information is 04602, use of the PPR 1 is forbidden.

If the region information of the operator corresponding to the subscription profile belongs to the forbidden-region information corresponding to the policy rule, step S1026 is to be performed to forbid use of the policy rule; or if the region information of the operator corresponding to the subscription profile does not belong to the forbidden-region information corresponding to the policy rule, step S1023 is to be performed.

S1023. Determine, based on user authorization information corresponding to the policy rule, whether setting of the policy rule requires user consent.

In specific implementation, if the user authorization information corresponding to the policy rule is "Yes" (yes), the LPA determines that the setting of the policy rule requires user consent; or if the user authorization information corresponding to the policy rule is "No" (no), the LPA determines that the setting of the policy rule does not require user consent.

If the setting of the policy rule requires user consent, step S1024 is to be performed; or if the setting of the policy rule does not require user consent, step S1025 is to be performed.

S1024. After user consent is obtained, allow use of the policy rule.

In specific implementation, after the determining is performed on each policy rule included in the subscription profile one by one, for policy rules of which setting requires user consent, a user may be uniformly requested to consent to setting of the policy rules.

S1025. Allow use of the policy rule.

S1026. Forbid use of the policy rule.

It should be noted that the LPA may obtain user authorization before obtaining the subscription profile, in other words, all of steps S1021 to S1026 are performed before the terminal obtains the subscription profile; or the LPA may obtain user authorization after obtaining the subscription profile, in other words, steps S1021 and S1022 may be performed before the terminal obtains the subscription profile and after the terminal obtains the subscription profile, and if no user authorization is obtained, the LPA may discard the subscription profile.

Figure 6:
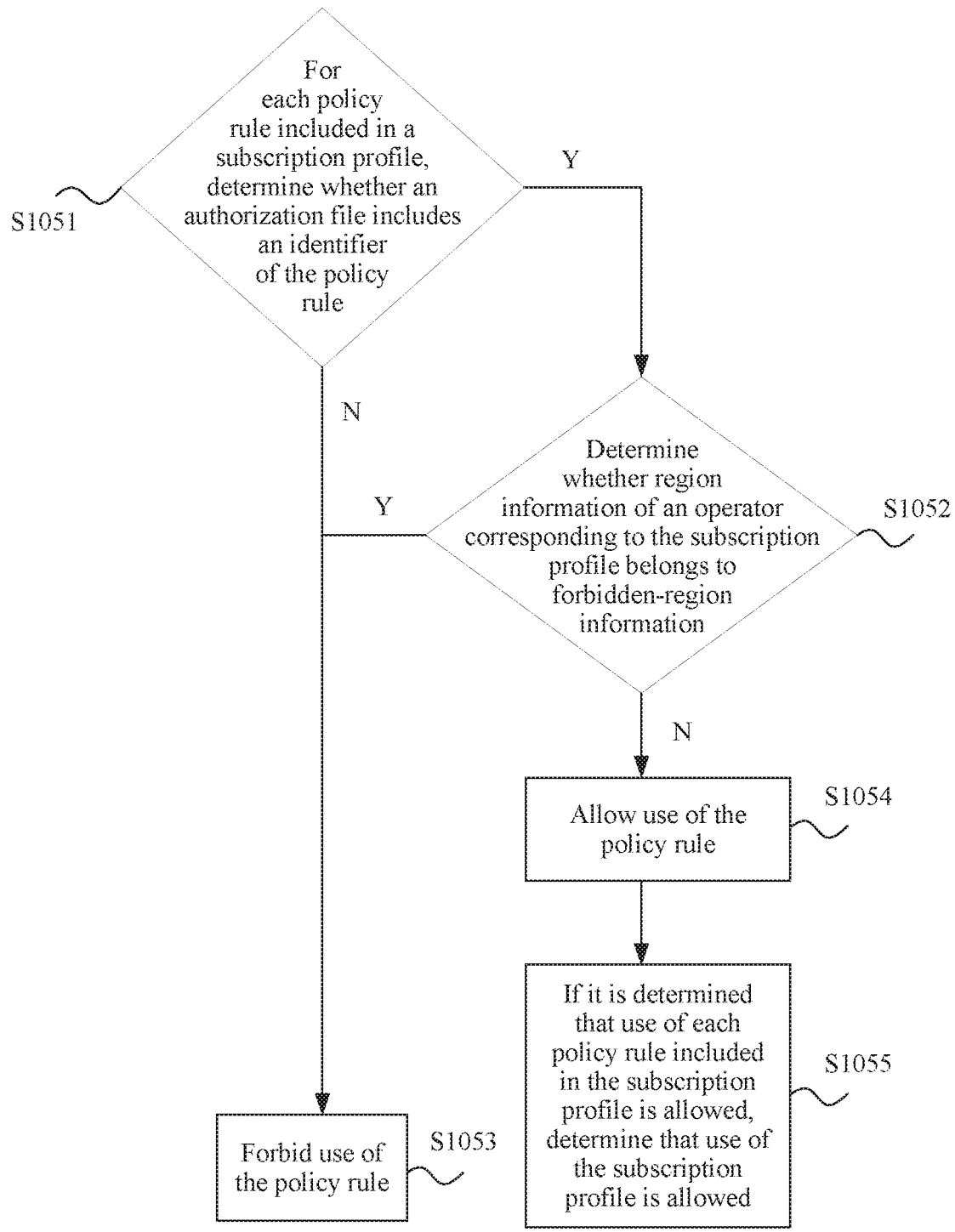
FIG. 6 is a schematic flowchart for determining, by an eUICC, whether use of a subscription profile is allowed according to an embodiment of the present invention.
Figure 7A:
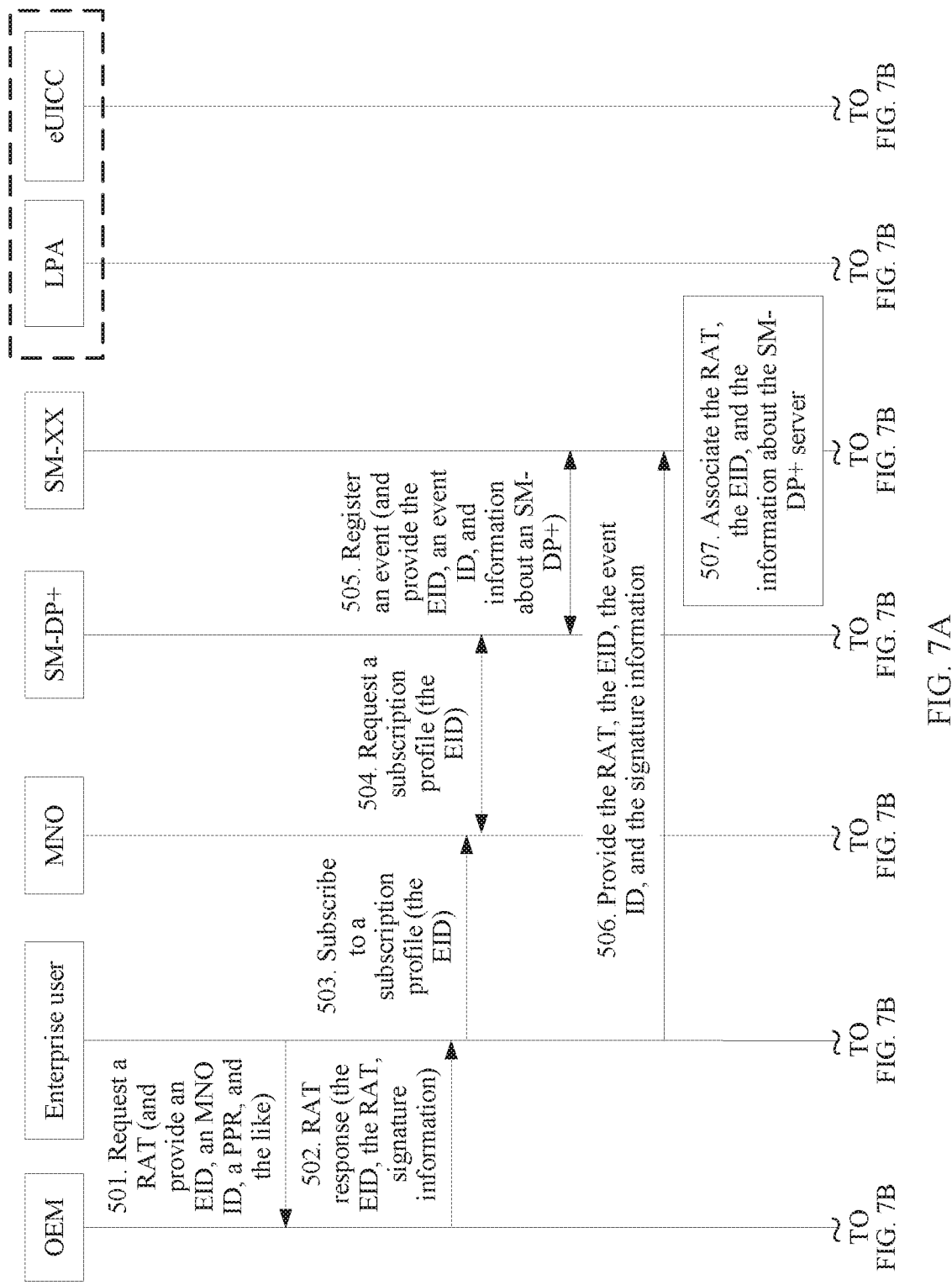
Figure 7C:
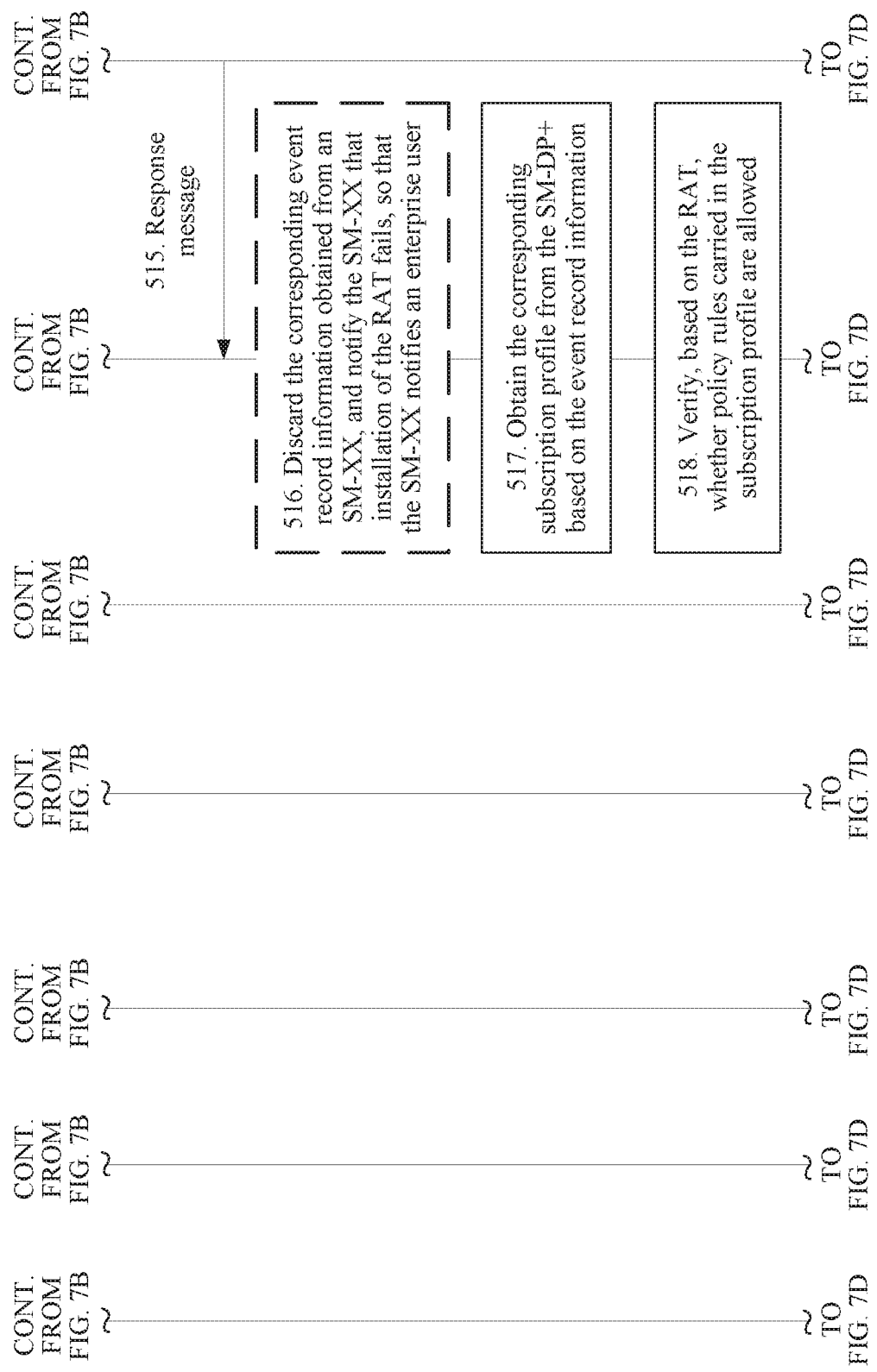
Figure 7D:
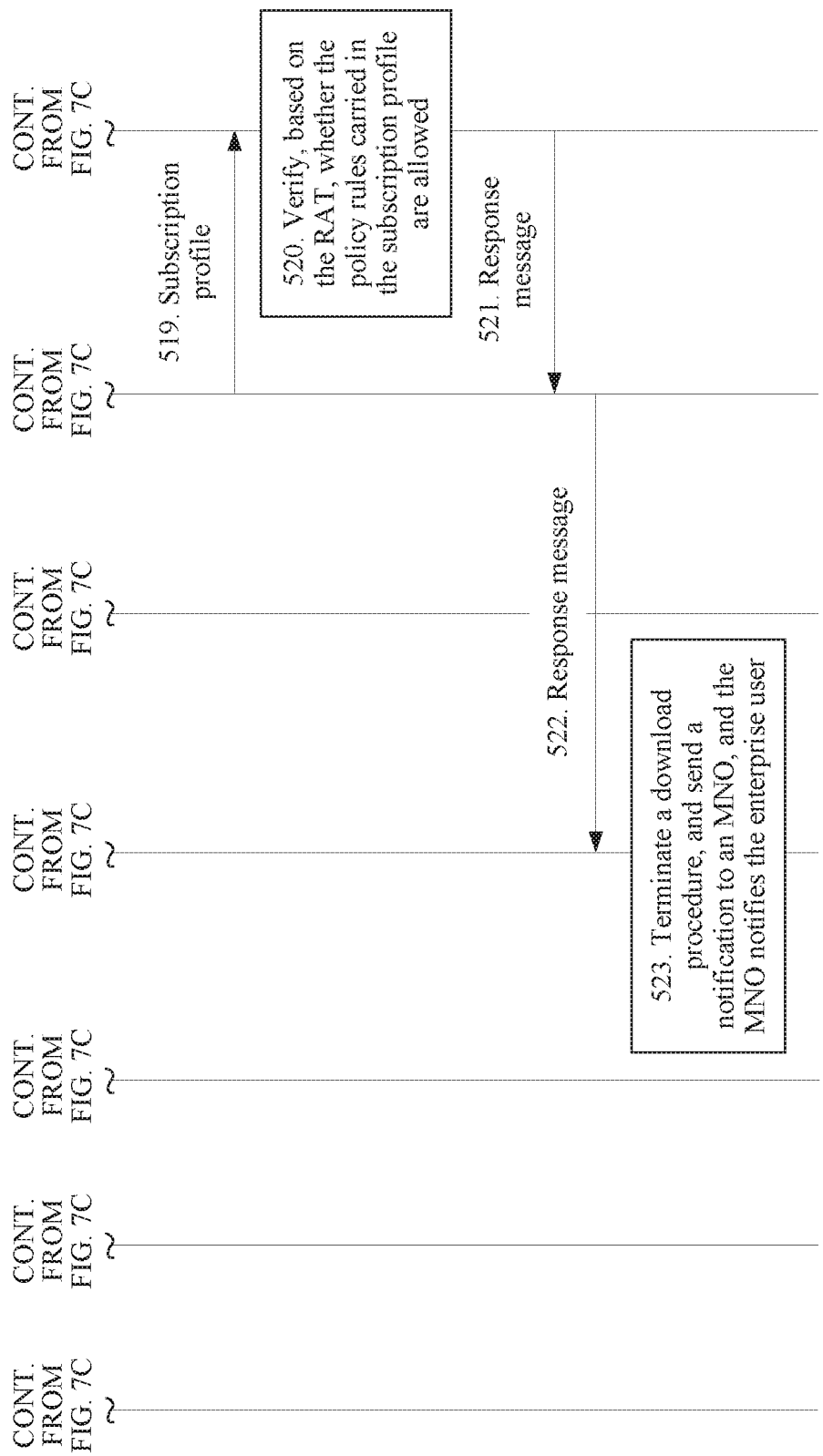

Specifically, the eUICC does not have a function of obtaining user authorization, and therefore, when whether use of the subscription profile is allowed is determined, there is no need to determine whether user authorization is required. Referring to FIG. 6, that the eUICC determines whether the use of the subscription profile is allowed specifically includes:

S1051. For each policy rule included in the subscription profile, determine whether the authorization file includes an identifier of the policy rule.

If it is determined that the authorization file includes the identifier of the policy rule, step S1052 is to be performed; or if the authorization file does not include the identifier of the policy rule, a step is to be performed to forbid use of the policy rule.

S1052. Determine whether region information of an operator corresponding to the subscription profile belongs to forbidden-region information corresponding to the policy rule.

If the region information of the operator corresponding to the subscription profile is the same as the forbidden-region information corresponding to the policy rule, step S1053 is to be performed; or if the region information of the operator corresponding to the subscription profile is different from the forbidden-region information corresponding to the policy rule, step S1054 is to be performed.

S1053. Forbid use of the policy rule.

S1054. Allow use of the policy rule.

S1055. If it is determined that use of each policy rule included in the subscription profile is allowed, determine that the use of the subscription profile is allowed.

Embodiment 2

This embodiment of the present invention provides a method for configuring an authorization file. As shown in FIG. 7A, FIG. 7B, FIG. 7C, and FIG. 7D, the method includes the following steps.

It should be noted that this embodiment of the present invention is applicable to but is not limited to the following scenario: Terminals with embedded eUICCs are purchased for an enterprise user in batches, and no RAT is configured in the eUICCs in the terminals, or an existing RAT needs to be updated. A designated person in an enterprise needs to uniformly request RATs for the terminals. In this embodiment, a method for configuring an authorization file is described by using one terminal as an example.

501. The enterprise user applies to an OEM (Original Equipment Manufacturer, original equipment manufacturer) for a RAT file, and provides an EID of the terminal, a policy rule that the terminal is allowed to set, and applicable-operator information, user authorization information, and forbidden-region information that are corresponding to each policy rule.

The enterprise user (enterprise) herein is the designated person that uniformly applies for the RATs for the terminals. The terminal herein is any one of the terminals.

In specific implementation, the provided EID of the terminal is an ID of the eUICC in the terminal, the policy rule that the terminal is allowed to set is a PPR allowed for the terminal, the applicable-operator information is an MNO ID, an ID of an operator to which the PPR is applicable, the user authorization information is whether setting of a policy rule requires user confirmation, and the forbidden-region information is information about a region in which use of a policy rule is forbidden and all operators in the region are not allowed to set the policy rule.

502. The OEM generates a RAT based on a requirement of the enterprise user, and sends the EID, the RAT, and signature information to the enterprise user.

Herein, the OEM generates the RAT based on the information provided by the enterprise user in step 201, and generates the signature information based on the EID and the RAT.

503. The enterprise user subscribes to a subscription profile (profile) from an MNO, and provides the EID.

In other words, the enterprise user provides the EID for the MNO to request the MNO to customize a subscription profile for the terminal corresponding to the EID.

504. The MNO provides the EID and an address of an SM-XX for an SM-DP+, to request the SM-DP+ to generate a profile.

505. The SM-DP+ generates an event ID and registers an event with the SM-XX.

The SM-XX herein may be the SM-DS in the system shown in FIG. 1 or an SM-SR+ (Subscription Manager-Secure Routing, subscription manager-secure routing) server. In the prior art, the SM-DS only accepts the event sent by the SM-DP+, and then downloads the event to an LPA. In the prior art, an SM-SR is configured to set up a secure communication channel to the eUICC, and may manage (for example, activate, deactivate, or delete) a profile in the eUICC. In this embodiment of the present invention, functions of the SM-DS and the SM-SR are integrated to form a new server, or functions of the SM-DS and the SM-SR are separately extended. In this way, the enterprise user may configure, in a server (the new server, or an SM-DS whose function is extended, or an SM-SR+ whose function is extended), the RAT that needs to be downloaded to the eUICC. When the LPA contacts the server, the RAT may be downloaded to the eUICC. When an event in the server is associated with the RAT, both the RAT and the event are downloaded to the LPA.

In specific implementation, after generating the subscription profile, the SM-DP+ generates an event "Downloading a profile", and generates an event ID of the event. Then, the SM-DP+ provides the EID and an event record event record for the SM-XX. The event record includes the event ID and information (for example, address information) about the SM-DP+ server. The SM-XX registers the event ID and records an association relationship between the event ID and the EID.

506. The enterprise user configures the RAT in the SM-XX, and if there is an associated event ID, configures the corresponding event ID in the SM-XX.

In specific implementation, the enterprise user configures, in the SM-XX, the RAT, the EID associated with the RAT, the event ID, and the signature information that is obtained in step 502.

507. The SM-XX associates the RAT, the EID, and information about the SM-DP+ server based on the event ID.

Herein, the SM-XX records association relationships between the event ID, the RAT, the EID, and the information about the SM-DP+ server.

508. When the terminal is initialized, the terminal initiates polling (a polling message) to the SM-XX based on the preconfigured address of the SM-XX, to perform two-way authentication with the SM-XX.

In specific implementation, the polling carries the EID corresponding to the terminal, and therefore, the SM-XX may obtain the EID corresponding to the terminal.

509. The SM-XX searches for the corresponding RAT, event ID, and information about the SM-DP+ based on the EID.

In step 207, the SM-XX records the association relationships between the event ID, the RAT, the EID, and the information about the SM-DP+ server. Therefore, the SM-XX may find, based on the EID, the event ID and the information about the SM-DP+ server that are associated with the EID.

510. The SM-XX sends the RAT, the EID, the signature information, and an event record (event record) to an LPA.

Herein, the event record includes the event ID and the information about the SM-DP+ server, for example, an address of the SM-DP+ server.

It should be noted that if the RAT is associated with an event record (event record, including an event ID and information about an SM-DP+ server), the SM-XX first sends the RAT and then sends the corresponding event record.

511. The LPA verifies whether a signature is correct, and if the signature is correct, verifies whether the received EID matches an EID of a local eUICC.

The received EID herein is the EID associated with the RAT, the event ID, and the like. Whether the received RAT is customized for the terminal may be determined by verifying whether the EID matches the EID of the local eUICC in the terminal. Further, if the EID matches the EID of the local eUICC in the terminal, it indicates that the received RAT is customized for the terminal.

It should be noted that, before this, the LPA may further determine whether the terminal is in an initialization process, and perform the foregoing verification action only if the LPA determines that the terminal is in the initialization process.

If the EID does not match the EID of the local eUICC or the signature authentication fails, step 512 is to be performed; or if the signature authentication is successful and the EID matches the EID of the local eUICC, step 513 is to be performed.

512. The LPA discards the event record obtained from the SM-XX, and notifies the SM-XX that the request for a RAT fails, so that the SM-XX notifies the enterprise user.

In other words, when the verification fails, it proves that the RAT received by the LPA is not customized for the terminal, and therefore the event record associated with the RAT may be discarded, and a failure message may be returned to the SM-XX.

513. The LPA sends the RAT file to the eUICC.

514. The eUICC receives and configures the RAT.

Specifically, if no RAT is locally installed in the eUICC, the eUICC stores the received RAT; or if a RAT is locally installed in the eUICC, the eUICC updates the local existing RAT based on the received RAT.

The RAT provided in this embodiment of the present invention includes a management indicator (management operation) that is used to indicate that an operation corresponding to the management indicator is addition or removal. For example, a management indicator corresponding to a PPR 1 is addition, in other words, addition of the PPR 1 is indicated.

Further, the eUICC combines the new RAT with the existing RAT in the eUICC based on an indication of the management indicator in the RAT. If there are no other RATs in the current eUICC, the eUICC may directly store the received RAT.

It should be noted that, before the eUICC configures the RAT, the eUICC may further verify whether any subscription profile has been currently installed, and if any subscription profile has been currently installed, the eUICC may refuse to install the downloaded RAT. This is because a policy rule included in the newly downloaded subscription profile may affect use of the existing subscription profile. In this case, the installed subscription profile may be deleted, and then the newly downloaded RAT is installed.

515. The eUICC sends a response message to the LPA.

The response message herein indicates a result of installation of the RAT by the eUICC. If the installation response indicates an installation error, step 516 is to be performed; or if the installation response indicates that the RAT is installed successfully, step 517 is to be performed.

516. The LPA discards the corresponding event record obtained from the SM-XX, and notifies the SM-XX that installation of the RAT fails, so that the SM-XX notifies the enterprise user.

Similar to step 512, if the installation of the RAT fails, the event record associated with the RAT may be discarded.

517. The LPA obtains the corresponding profile from the SM-DP+ based on the event record.

Specifically, the LPA accesses the SM-DP+ server based on the information about the SM-DP+ server in the event record, and sends the EID and the event ID in the event record to the SM-DP+ server, and the SM-DP+ server determines, based on the EID and the event ID, that the LPA needs to download the subscription profile, and sends the subscription profile to the LPA.

518. The LPA verifies, based on the RAT, whether policy rules carried in the subscription profile are allowed.

Specifically, for any policy rule in the subscription profile, the LPA first checks whether the PPR is defined in the RAT, and then determines whether region information of an operator corresponding to the profile belongs to forbidden-region information corresponding to the policy rule. The region information of the operator corresponding to the profile may be an MNO ID (usually including a mobile country code MCC corresponding to the operator and a mobile network code MNC of the operator). In this case, the LPA determines whether the MCC in the MNO ID belongs to an MCC corresponding to the forbidden-region information, in other words, determines whether a region to which the applicable operator corresponding to the PPR belongs is a region in which the PPR is forbidden. If the MCC in the MNO ID is the same as the MCC corresponding to the forbidden-region information, use of the policy rule is forbidden, and then installation of the profile is refused. If the MCC in the MNO ID is different from the MCC corresponding to the forbidden-region information, use of the policy rule is allowed, and whether setting of the PPR requires user consent is determined based on user authorization information corresponding to the PPR. If the setting can be performed only after user consent is obtained, a user is notified, by using an LUI in the terminal, that the PPR is to be set, and after the user agrees, step 519 is to be performed.

519. The LPA sends the subscription profile to the eUICC.

520. The eUICC verifies, based on the RAT, whether the policy rules carried in the subscription profile are allowed.

Specifically, for any policy rule in the subscription profile, the LPA first checks whether the PPR is defined in the RAT, and then determines whether region information of an operator corresponding to the subscription profile belongs to forbidden-region information of the policy rule. The region information of the operator corresponding to the subscription profile may be an MNO ID (usually including a mobile country code MCC corresponding to the operator and a mobile network code MNC of the operator). In this case, the LPA determines whether the MCC in the MNO belongs to an MCC corresponding to the forbidden-region information, in other words, determines whether a region to which the applicable operator corresponding to the PPR belongs is a region in which the PPR is forbidden. If the MCC in the MNO ID is the same as the MCC corresponding to the forbidden-region information, use of the policy rule is forbidden, and then installation of the subscription profile is refused. If the MCC in the MNO ID is different from the MCC corresponding to the forbidden-region information, use of the policy rule is allowed, and then the subscription profile is installed.

521. The eUICC sends a response message to the LPA.

522. The LPA sends a response message to the SM-DP+.

523. The SM-DP+ terminates a download procedure, and sends a response message to the MNO, and the MNO notifies the enterprise user.

It should be noted that if the to-be-downloaded subscription profile includes a policy rule, and the policy rule needs to be supported by configuring the RAT, the RAT may be associated with the event ID. Alternatively, the RAT may not be associated with the event ID, and in this case, the RAT may be first downloaded, and then the event ID is registered with and obtained from the SM-DP+.

Embodiment 3

Figure 8A:
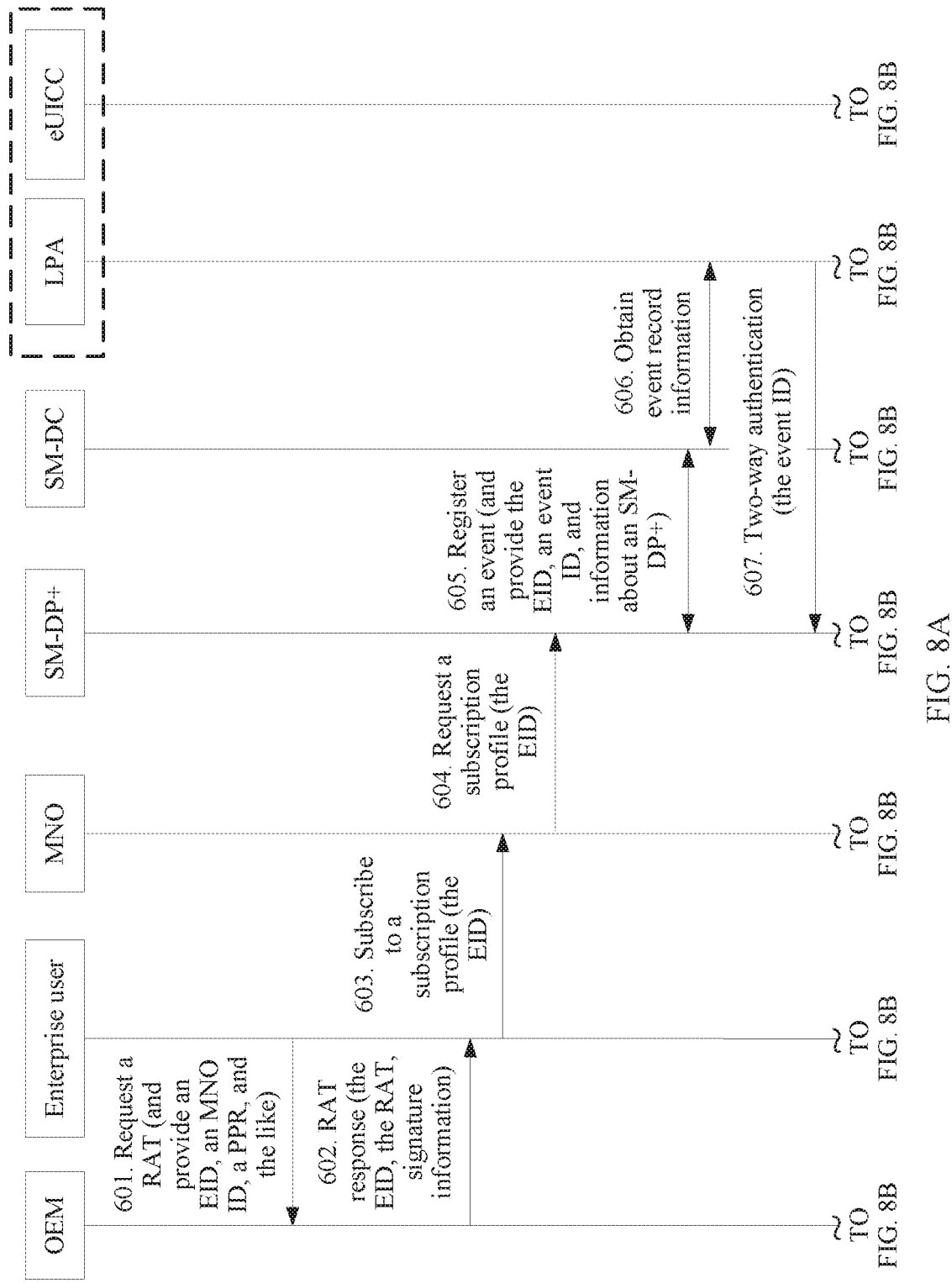
FIG. 8A, FIG. 8B, and FIG. 8C are another schematic flowchart of a method for installing a subscription profile according to an embodiment of the present invention.
Figure 8B:
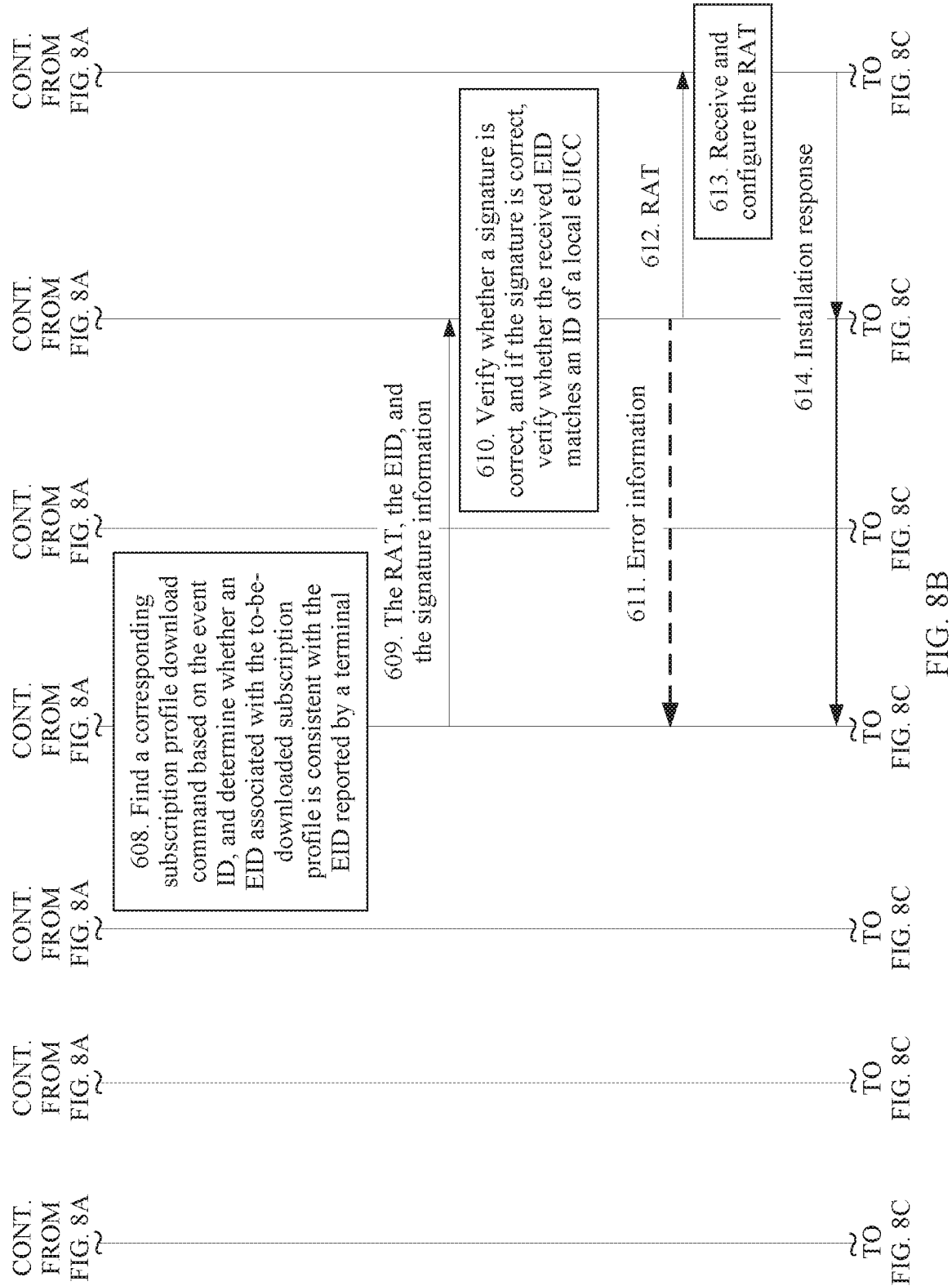
Figure 8C:
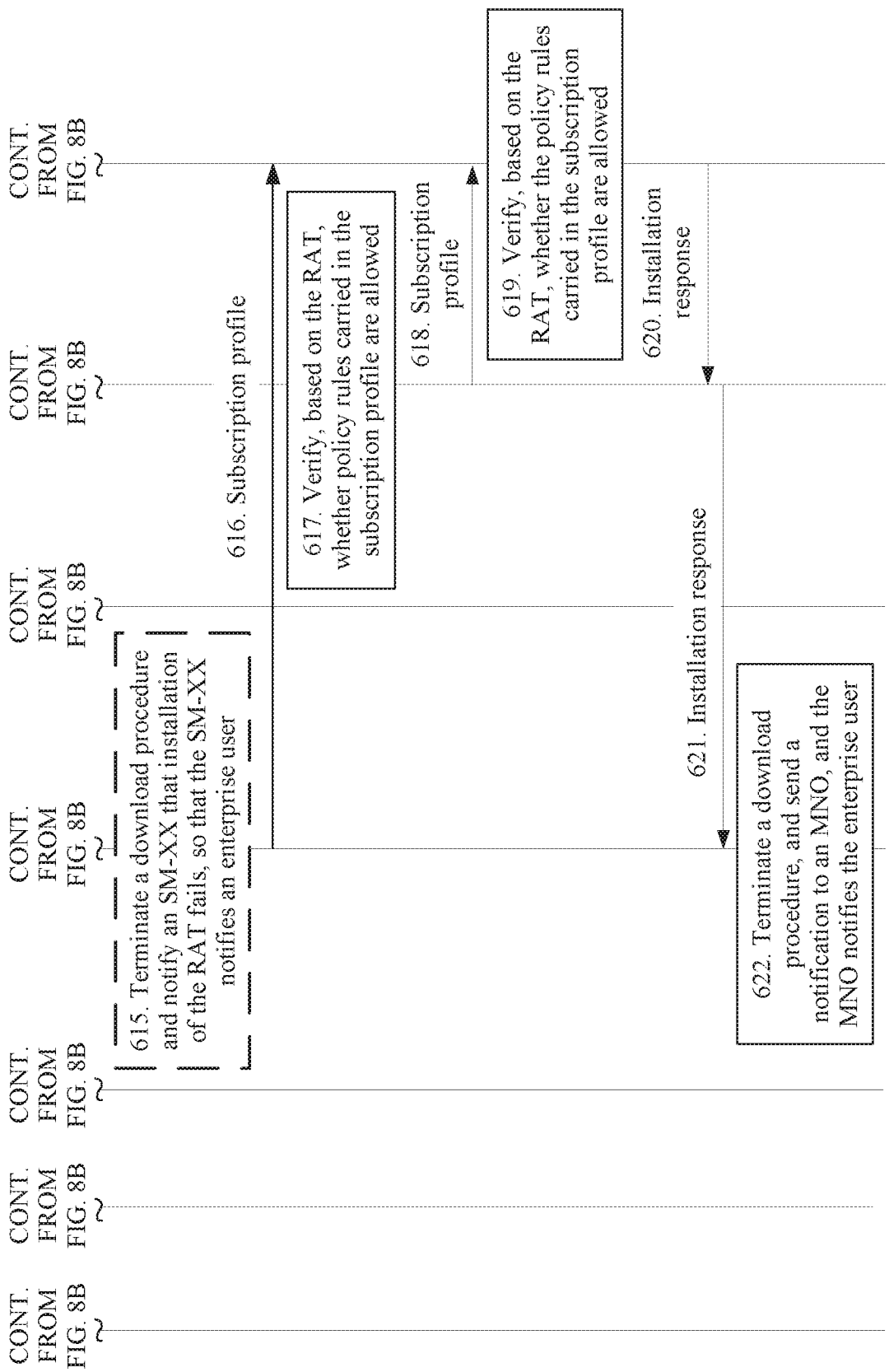

This embodiment of the present invention provides a method for configuring an authorization file. A difference from the method provided in Embodiment 2 is as follows: A RAT is no longer downloaded from an SM-XX, but is downloaded from an SM-DP+ server to a terminal. Specifically, as shown in FIG. 8A, FIG. 8B, and FIG. 8C, the method includes the following steps.

601. An enterprise user applies to an OEM for a RAT file, and provides an EID of a terminal, a PPR (policy rule) that the terminal is allowed to set, and applicable-operator information MNO ID, user authorization information, and forbidden-region information that are corresponding to each policy rule.

602. The OEM generates a RAT based on a requirement of the enterprise user, generates signature information based on the EID and the RAT by using a private key, and sends the EID, the RAT, and the signature information to the enterprise user.

603. The enterprise user subscribes to a subscription profile from an MNO (operator), and provides the EID, the RAT, the signature information, and the like.

604. The MNO provides the EID, the RAT, and the signature information for an SM-DP+, to request the SM-DP+ to generate a subscription profile, or the MNO may provide an address of an SM-XX to request the SM-DP+ to register a subscription profile download event with the SM-XX.

605. If the MNO provides the address of the SM-XX for the SM-DP+ in step 604, the SM-DP+ generates an event ID, and registers the event ID with an SM-DS.

Specifically, after generating the subscription profile, the SM-DP+ generates an event "Downloading a profile", and generates an event ID of the event. The SM-DP+ may further associate the subscription profile with the event ID. Then, the SM-DP+ registers the event ID of the event with the SM-DS. For example, the SM-DP+ provides the EID and an event record event record for the SM-DS. The event record includes the event ID and information (for example, address information) about the SM-DP+ server. The SM-DS registers the event ID and records an association relationship between the event ID and the EID.

606. When the terminal is initialized, the terminal initiates polling to the SM-DS based on a preconfigured address of the SM-DS, to perform two-way authentication with the SM-DS, and then obtains an event record (event record) from the SM-DS.

Herein, the event record includes the event ID and the information about the SM-DP+ server, for example, an address of the SM-DP+ server.

607. The LPA communicates with the SM-DP+ based on an address of the SM-DP+, to perform two-way authentication, and requests to download a profile.

In specific implementation, a request message sent by the LPA to the SM-DP+ carries the event ID, and the event ID indicates an event, for example, "Downloading a profile".

608. The SM-DP+ finds a corresponding subscription profile download command based on the event ID, and determines whether an EID associated with the to-be-downloaded profile is consistent with the EID reported by the terminal.

It should be noted that in step 604, the MNO provides the EID, the RAT, and the signature information for the SM-DP+ to request the SM-DP+ to generate the subscription profile. After generating the subscription profile, the SM-DP+ may associate the profile, the EID, and the RAT, and then in step 605, the SM-DP+ obtains the event ID, and associate the subscription profile, the EID, the RAT, and the event ID.

In addition, step 608 may be alternatively as follows: The SM-DP+ finds a corresponding subscription profile download command based on the EID, and determines whether an event ID associated with the to-be-downloaded subscription profile is consistent with the event ID reported by the terminal. If the event ID associated with the to-be-downloaded subscription profile is consistent with the event ID reported by the terminal, step 609 is to be performed.

Herein, in practice, whether there is a RAT associated with the to-be-downloaded subscription profile is determined. If the EID associated with the subscription profile is consistent with the EID reported by the terminal, it indicates that there is a RAT associated with the to-be-downloaded subscription profile. In this case, step 609 is to be performed.

609. The SM-DP+ sends the EID, the RAT, and the signature information to the LPA.

610. The LPA verifies whether a signature is correct, and if the signature is correct, verifies whether the received EID matches an ID of a local eUICC.

The received EID herein is the EID associated with the RAT, the event ID, and the like. Whether the received RAT is customized for the terminal may be determined by verifying whether the EID matches the EID of the local eUICC in the terminal. Further, if the EID matches the EID of the local eUICC in the terminal, it indicates that the received RAT is customized for the terminal.

Before this, the LPA may further determine whether the terminal is in an initialization process, and perform the foregoing verification action only if the LPA determines that the terminal is in the initialization process.

If the EID does not match the EID of the local eUICC or the signature authentication fails, step 611 is to be performed; or if the signature authentication is successful and the EID matches the EID of the local eUICC, step 612 is to be performed.

611. The LPA sends error information to the SM-DP+, and the SM-DP+ terminates a download command and notifies the MNO, and the MNO notifies the enterprise user.

In other words, when the verification fails, it proves that the RAT received by the LPA is not customized for the terminal, and therefore a failure message may be returned to the SM-XX.

612. The LPA sends the RAT file to the eUICC.

613. The eUICC receives and configures the RAT.

For a specific procedure, refer to the detailed description of step 214 in Embodiment 2. Details are not described herein again.

614. The eUICC sends an installation response to the LPA.

The installation response herein indicates a result of installation of the RAT by the eUICC. If the installation response indicates an installation error, step 615 is to be performed; or if the installation response indicates that the RAT is installed successfully, step 616 is to be performed.

615. The SM-DP+ terminates a download procedure and notifies the MNO.

In other words, the SM-DP+ notifies the MNO that installation of the RAT fails.

616. The SM-DP+ sends the subscription profile to the LPA.

617. The LPA verifies, based on the RAT, whether policy rules carried in the profile are allowed.

Specifically, for any policy rule in the subscription profile, the LPA first checks whether the PPR is defined in the RAT, and then determines whether region information of an operator corresponding to the subscription profile belongs to forbidden-region information corresponding to the policy rule. The region information of the operator corresponding to the subscription profile may be an MNO ID (usually including a mobile country code MCC corresponding to the operator and a mobile network code MNC of the operator). In this case, the LPA determines whether the MCC in the MNO ID belongs to an MCC corresponding to the forbidden-region information, in other words, determines whether a region to which the applicable operator corresponding to the PPR belongs is a region in which the PPR is forbidden. If the MCC in the MNO ID is the same as the MCC corresponding to the forbidden-region information, use of the policy rule is forbidden, and then installation of the subscription profile is refused. If the MCC in the MNO ID is different from the MCC corresponding to the forbidden-region information, use of the policy rule is allowed, and whether setting of the PPR requires user consent is determined based on user authorization information corresponding to the PPR. If the setting can be performed only after user consent is obtained, a user is notified, by using an LUI in the terminal, that the PPR is to be set, and after the user agrees, step 618 is to be performed.

618. The LPA sends the subscription profile to the eUICC.

619. The eUICC verifies, based on the RAT, whether the policy rules carried in the subscription profile are allowed.

Specifically, for any policy rule (PPR) in the subscription profile, the LPA first checks whether the PPR is defined in the RAT, and then determines whether region information of an operator corresponding to the subscription profile belongs to forbidden-region information corresponding to the policy rule. The region information of the operator corresponding to the subscription profile may be an MNO ID (usually including a mobile country code MCC corresponding to the operator and a mobile network code MNC of the operator). In this case, the LPA determines whether the MCC in the MNO ID is an MCC corresponding to the forbidden-region information, in other words, determines whether a region to which the applicable operator corresponding to the PPR belongs is a region in which the PPR is forbidden. If the MCC in the MNO ID is the same as the MCC corresponding to the forbidden-region information, use of the policy rule is forbidden, and then installation of the subscription profile is refused. If the MCC in the MNO ID is different from the MCC corresponding to the forbidden-region information, use of the policy rule is allowed, and then the subscription profile is installed.

620. The eUICC sends an installation response to the LPA.

621. The LPA sends a notification to the SM-DP+.

622. The SM-DP+ terminates a download procedure, and sends a notification to the MNO, and the MNO notifies the enterprise user.

It should be noted that, the SM-DP+ may alternatively deliver both the subscription profile and the RAT to the LPA in step 609, and the LPA determines, based on the RAT, whether the subscription profile may be installed. For details, refer to steps 617 to 619. Details are not described herein.

In the method for installing a subscription profile in this embodiment of the present invention, the LPA in the terminal obtains the authorization file, and then transfers the authorization file to the eUICC in the terminal for configuration. In addition, a region in which a policy rule cannot be used is defined in the authorization file, so that use of the policy rule by an operator in the specific region can be limited based on the authorization file, and there is no need to limit use of the policy rule by operators in all regions. In this way, an application scope of the terminal is effectively expanded.

In addition, an embodiment of the present invention provides a terminal. The terminal is configured to perform the steps performed by the terminal in the foregoing methods for installing a subscription profile. The terminal provided in this embodiment of this application may include modules corresponding to corresponding steps.

In this embodiment of this application, the terminal may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. The module division in this embodiment of this application is an example, and is merely logical function division. There may be other division manners in actual implementation.

Figure 9:
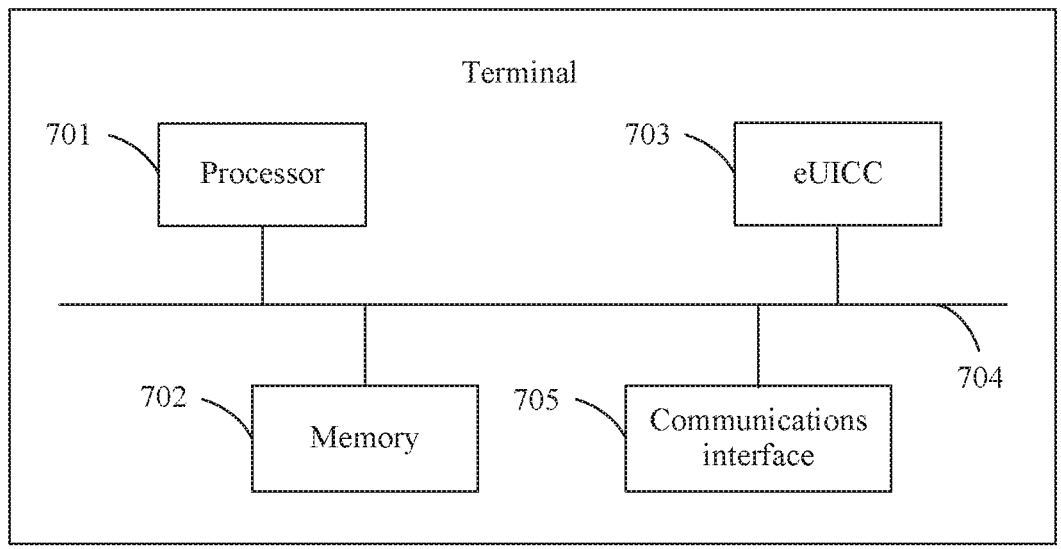
FIG. 9 is a structural block diagram of a terminal according to an embodiment of the present invention.

When integrated units are used, FIG. 9 is a possible schematic structural diagram of a terminal related to the foregoing embodiments. As shown in FIG. 9, the terminal includes a processor 701, a memory 702, an integrated circuit card eUICC 703, a system bus 704, and a communications interface 705. The processor 701 is configured to perform steps 101 to 104 in the method shown in FIG. 2. The eUICC 703 is configured to perform steps 105 and 106 in the method shown in FIG. 2. The terminal interacts, by using the communications interface 705, with other devices such as a first subscription management server and a second subscription management server.

In a specific implementation of this application, the memory 702 may include a volatile memory, for example, an NVRAM (Nonvolatile Random Access Memory, nonvolatile dynamic random access memory), a PRAM (Phase-Change RAM, phase-change random access memory), or an MRAM (Magnetic Random Access Memory, magnetoresistive random access memory). Alternatively, the memory 702 may include a nonvolatile memory, for example, at least one disk storage device, an EEPROM (Electrically Erasable Programmable Read-Only Memory, electrically erasable programmable read-only memory), or a flash storage device such as a NOR flash memory (NOR flash memory) or a NAND flash memory (NAND flash memory). The nonvolatile memory stores an operating system and an application program that are executed by the processor. The processor 701 loads a running program and data from the nonvolatile memory to the memory, and stores data content in a massive storage apparatus.

The processor 701 is a control center of the terminal. The processor 701 connects all parts of the entire terminal by using various interfaces and lines. By running or executing a software program and/or an application module stored in the memory 172 and by invoking data stored in the memory 702, the processor 701 performs various functions of the terminal and processes data, to implement overall monitoring on the terminal.

The processor 701 may include only a CPU, or may be a combination of a CPU, a GPU (Graphics Processing Unit, graphics processing unit), a DSP, and a control chip (for example, a baseband chip) in a communications unit. In an implementation of this application, the CPU may be a single operation core, or may include a plurality of operation cores.

The system bus 704 may be an ISA (Industry Standard Architecture, industry standard architecture) bus, a PCI (Peripheral Component Interconnect, peripheral component interconnect) bus, an EISA (Extended Industry Standard Architecture, extended industry standard architecture) bus, or the like. The system bus 704 may be classified into an address bus, a data bus, a control bus, and the like. In this embodiment of this application, for clarity of description, various buses in FIG. 9 are marked as the system bus 704.

Figure 10:
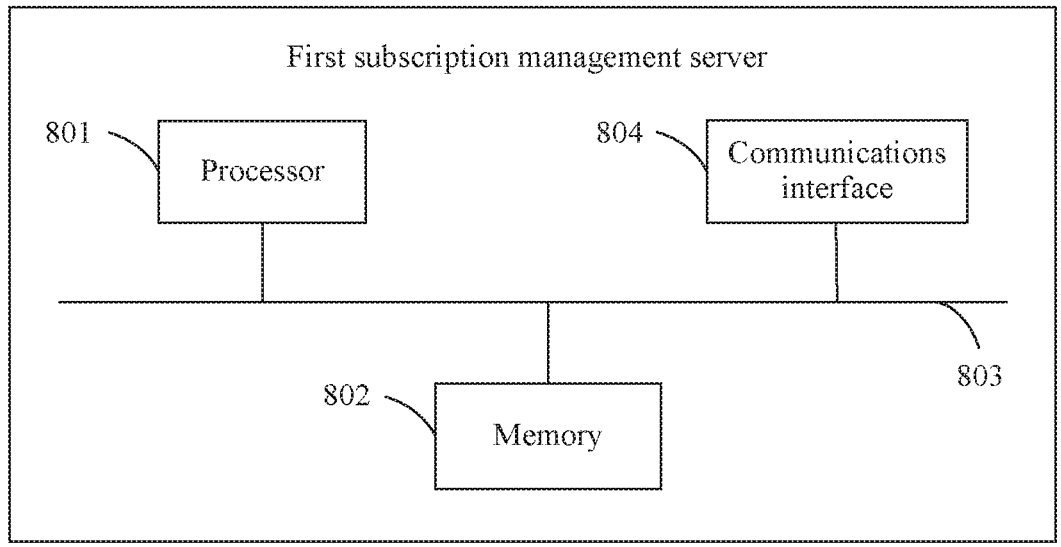
FIG. 10 is a structural block diagram of a first subscription management server according to an embodiment of the present invention.

FIG. 10 is a possible schematic structural diagram of a first subscription management server related to the foregoing embodiments. As shown in FIG. 10, the first subscription management server includes a processor 801, a memory 802, a system bus 803, and a communications interface 804. The processor 801 is configured to perform steps 201 to 203 in the method shown in FIG. 3. The first subscription management server interacts, by using the communications interface 804, with other devices such as a terminal and a second subscription management server.

Figure 11:
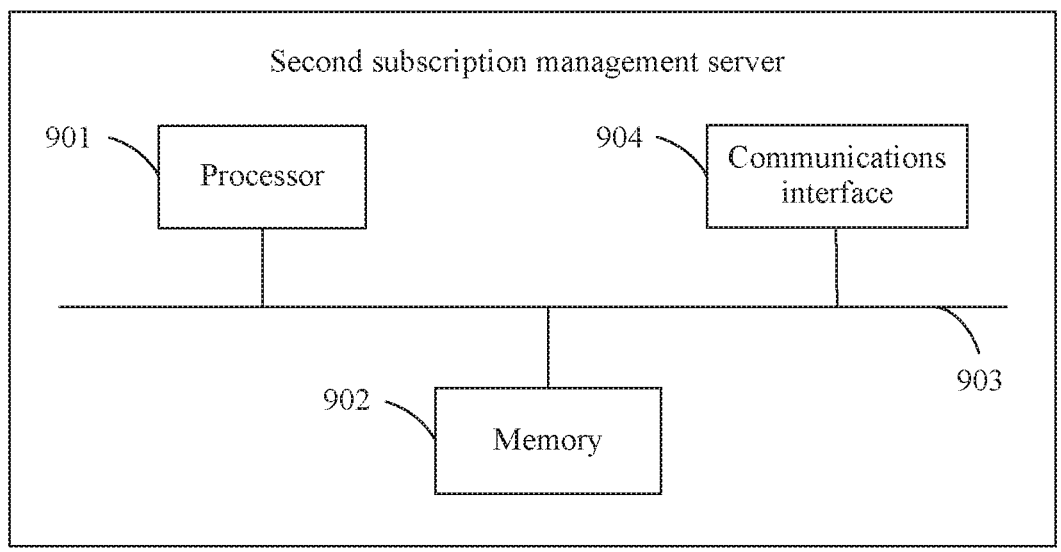
FIG. 11 is a structural block diagram of a second subscription management server according to an embodiment of the present invention.

FIG. 11 is a possible schematic structural diagram of a second subscription management server related to the foregoing embodiments. As shown in FIG. 11, the second subscription management server includes a processor 901, a memory 902, a system bus 903, and a communications interface 904. The processor 901 is configured to perform steps 301 to 304 in the method shown in FIG. 4. The second subscription management server interacts, by using the communications interface 904, with other devices such as a first subscription management server and a terminal.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of a mobile device is divided into different function modules to implement all or part of the functions described above. For a detailed working process of the foregoing system, mobile device, and unit, refer to a corresponding process in the foregoing method embodiments, and details are not described herein again.

In the several embodiments provided in this application, it should be understood that the disclosed system, mobile device, and method may be implemented in other manners. For example, the described mobile device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the mobile devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The storage medium includes: any medium that can store program code, such as a USB flash drive (Universal Serial Bus flash drive, universal serial bus flash drive), a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for installing a subscription profile, the method comprising:
obtaining, by a local profile assistant (LPA) in a terminal, metadata of a subscription profile, wherein the metadata comprises at least one first policy rule;
determining, by the LPA based on an authorization file, whether each of the first policy rules is allowed to determine whether the first policy rule includes one or more allowed policy rules, wherein the authorization file comprises:
an identifier of one or more first policy rules;
forbidden-region information corresponding to each of the first policy rules;
a management indicator of each of the first policy rules;
user authorization information of each of the first policy rules; and
applicable-operator information of each of the first policy rules, wherein
determining whether the first policy rule includes one or more allowed policy rules further comprises:
determining for each of the first policy rules whether the authorization file comprises an identifier of the first policy rule;
forbidding use of policy rules for which the authorization file does not comprise the identifier;
determining whether region information of an operator corresponding to the subscription profile belongs to forbidden-region information corresponding to each first policy rule;
allowing use of first policy rules whose forbidden-region information does not correspond to the region information of the operator corresponding to the subscription profile;
forbidding use of first policy rules whose forbidden-region information corresponds to the region information of the operator corresponding to the subscription profile;
determining whether, for each first policy rule, the applicable-operator information corresponds to an operator allowed to use a corresponding policy rule;
allowing use of each first policy rule whose applicable-operator information corresponds to an operator allowed to use a corresponding policy rule;
forbidding use of the first policy rules whose applicable-operator information does not correspond to an operator allowed to use a corresponding policy rule;
determining whether the user authorization information corresponding to each first policy rule indicates that setting first policy rule requires user consent;
allowing use of a fourth policy rule whose corresponding user authorization information indicates that the setting of the fourth policy rule does not require user consent;
allowing use of a fifth policy rule, after a user consents to the setting of a fifth policy rule whose corresponding user authorization information indicates that the setting of the fifth policy rule requires user consent;
obtaining, by the LPA, the subscription profile of the allowed policy rules when the first policy rule includes allowed policy rules;
sending, by the LPA, the subscription profile to an embedded universal integrated circuit card (eUICC) in the terminal;
determining, by the eUICC based on the authorization file, whether use of the subscription profile is allowed; and
installing, by the eUICC, the subscription profile when the use of the subscription profile is allowed.

2. The method of claim 1, wherein after obtaining the subscription profile, the method further comprises:
determining, by the LPA, a policy rule requiring user authorization in the subscription profile, wherein the policy rule requiring the user authorization is set when user consent is obtained; and
sending, by the LPA, the subscription profile to the eUICC when a user consents to setting of the policy rule requiring the user authorization.

3. The method of claim 1, further comprising:
obtaining, by the LPA, the authorization file;
sending, by the LPA, the authorization file to the eUICC;
storing, by the eUICC, the authorization file when the eUICC does not comprise a local authorization file; and
updating, by the eUICC, the local authorization file based on the authorization file when the eUICC comprises the local authorization file.

4. The method of claim 3, wherein updating the local authorization file comprises adding, by the eUICC for each second policy rule of the first policy rules whose corresponding management indicator is addition, the second policy rule, the user authorization information of the second policy rule, the applicable-operator information of the at least one second policy rule, and the forbidden-region information of the second policy rule to the local authorization file.

5. The method of claim 3, wherein updating the local authorization file comprises, when the management indicator of at least one third policy rule of the first policy rules is removal:
  deleting, by the eUICC for each third policy rule, the third policy rule, the user authorization information of the third policy rule, the applicable-operator information of the third policy rule, and the forbidden-region information of the third policy rule from the local authorization file, wherein user authorization information of the third policy rule is the user authorization information of the third policy rule, and wherein applicable-operator information of the third policy rule is the applicable-operator information of the third policy rule, and forbidden-region information of the third policy rule is the forbidden-region information of the third policy rule;
  deleting, by the eUICC for each of the third policy rule, the applicable-operator information of the third policy rule in the local authorization file, wherein the applicable-operator information of the third policy rule comprises the applicable-operator information of the third policy rule and other operator information, and wherein the user authorization information of the third policy rule comprises the user authorization information of the third policy rule, and the forbidden-region information of the third policy rule comprises the forbidden-region information of the third policy rule;
  deleting, by the eUICC for each third policy rule, the user authorization information of the third policy rule in the local authorization file, wherein the user authorization information of the third policy rule comprises the user authorization information of the third policy rule and other user authorization information, wherein the applicable-operator information of the third policy rule comprises the applicable-operator information of the third policy rule, and wherein the forbidden-region information of the third policy rule comprises the forbidden-region information of the third policy rule; and
  deleting, by the eUICC, the forbidden-region information of the third policy rule in the local authorization file, wherein the forbidden-region information of the third policy rule comprises the forbidden-region information of the third policy rule and other forbidden-region information, wherein the applicable-operator information of the third policy rule comprises the applicable-operator information of the third policy rule, and wherein the user authorization information of the third policy rule comprises the user authorization information of the third policy rule.

6. The method of claim 3, wherein obtaining the authorization file comprises:
  performing, by the eUICC, authentication with a first subscription management server to enable the first subscription management server to determine the authorization file and to deliver the authorization file to the LPA; and
  receiving, by the LPA, the authorization file from the first subscription management server.

7. The method of claim 6, further comprising:
  receiving, by the LPA, signature information and a first identifier associated with the authorization file from the first subscription management server, wherein the signature information is based on the first identifier and the authorization file;
  verifying, by the LPA, whether the signature information is correct; and
  determining, by the LPA, whether the first identifier is the same as a second identifier when the signature information is correct, wherein the second identifier is an identifier of the eUICC,
  wherein sending the authorization file to the eUICC comprises sending, by the LPA, the authorization file to the eUICC when the first identifier is the same as the second identifier.

8. The method of claim 7, comprising receiving, by the LPA, an event identifier (ID) and information about a second subscription management server, wherein obtaining the subscription profile comprises obtaining, by the LPA, the subscription profile from the second subscription management server based on the event ID and the information about the second subscription management server.

9. A terminal, comprising:
  an embedded universal integrated circuit card (eUICC); and
  a processor coupled to the eUICC and configured to:
    obtain metadata of a subscription profile, wherein the metadata comprises at least one first policy rule;
    determine, based on an authorization file, whether use of each of the first policy rules is allowed to determine whether the first policy rule includes one or more allowed policy rules, wherein the authorization file comprises:
      an identifier of one or more first policy rules;
      forbidden-region information corresponding to each of the one or more first policy rules;
      a management indicator of each of the first policy rules;
      user authorization information of each of the first policy rules; and
      applicable-operator information of each of the first policy rules, wherein determining whether the first policy rule includes one or more allowed policy rules further comprises:
      determining for each of the first policy rules whether the authorization file comprises an identifier of the first policy rule;
      forbidding use of policy rules for which the authorization file does not comprise the identifier;
      determining whether region information of an operator corresponding to the subscription profile belongs to forbidden-region information corresponding to each first policy rule;
      allowing use of first policy rules whose forbidden-region information does not correspond to the region information of the operator corresponding to the subscription profile;
      forbidding use of first policy rules whose forbidden-region information corresponds to the region information of the operator corresponding to the subscription profile;

determining whether, for each first policy rule, the applicable-operator information corresponds to an operator allowed to use a corresponding policy rule;

allowing use of each first policy rule whose applicable-operator information corresponds to an operator allowed to use a corresponding policy rule;

forbidding use of the first policy rules whose applicable-operator information does not correspond to an operator allowed to use a corresponding policy rule;

determining whether the user authorization information corresponding to each first policy rule indicates that setting first policy rule requires user consent;

allowing use of a fourth policy rule whose corresponding user authorization information indicates that the setting of the fourth policy rule does not require user consent; and allowing use of a fifth policy rule, after a user consents to the setting of a fifth policy rule whose corresponding user authorization information indicates that the setting of the fifth policy rule requires user consent;

obtain the subscription profile of the one or more allowed policy rules when the at least one first policy rule includes the one or more first allowed policy rules; and send the subscription profile to the eUICC, wherein the eUICC is configured to:
determine, based on the authorization file, whether use of the subscription profile is allowed; and
install the subscription profile when the use of the subscription profile is allowed.

10. The terminal of claim 9, wherein the processor is further configured to:

determine a policy rule requiring user authorization in the subscription profile after obtaining the subscription profile, wherein the policy rule requiring the user authorization is set when the user consent is obtained; and send the subscription profile to the eUICC when a user consents to setting of the policy rule requiring the user authorization.

11. The terminal of claim 9, wherein the processor is further configured to:

obtain the authorization file; and send the authorization file to the eUICC, wherein the eUICC is further configured to:
store the authorization file when the eUICC does not comprise a local authorization file;
update the local authorization file based on the authorization file when the eUICC comprises the local authorization file.

12. The terminal of claim 11, wherein the eUICC is further configured to add, for each second policy rule of the first policy rules whose corresponding management indicator is addition, the second policy rule, the user authorization information of the second policy rule, the applicable-operator information of the second policy rule, and the forbidden-region information of the second policy rule to the local authorization file.

13. The terminal of claim 11, wherein the eUICC is further configured to, when third policy rule of the first policy rules for which the management indicator is removal:

delete, from each of the third policy rule, the third policy rule and the user authorization information of the third policy rule, the applicable-operator information of the third policy rule, and the forbidden-region information of the third policy rule from the local authorization file, wherein user authorization information of the third policy rule is the user authorization information of the third policy rule, wherein the applicable-operator information of the third policy rule is the applicable-operator information of the third policy rule, and forbidden-region information of the third policy rule is the forbidden-region information of the third policy rule;

delete, from each third policy rule, the applicable-operator information of the third policy rule in the local authorization file, wherein the applicable-operator information of the third policy rule comprises the applicable-operator information of the third policy rule and other operator information, and wherein the user authorization information of the third policy rule comprises the user authorization information of the third policy rule, and the forbidden-region information of the third policy rule comprises the forbidden-region information of the third policy rule;

delete, from each third policy rule, the user authorization information of the third policy rule in the local authorization file, wherein the user authorization information of the third policy rule comprises the user authorization information of the third policy rule and other user authorization information, wherein the applicable-operator information of the third policy rule comprises the applicable-operator information of the third policy rule, and wherein the forbidden-region information of the third policy rule comprises the forbidden-region information of the third policy rule;

delete the forbidden-region information of the third policy rule in the local authorization file, wherein the forbidden-region information of the third policy rule comprises the forbidden-region information of the third policy rule and other forbidden-region information, wherein the applicable-operator information of the third policy rule comprises the applicable-operator information of the third policy rule, and wherein the user authorization information of the third policy rule comprises the user authorization information of the third policy rule.

* * * * *

UNITED STATES PATENT AND TRADEMARK OFFICE
CERTIFICATE OF CORRECTION

PATENT NO. : 10,667,123 B2
APPLICATION NO. : 16/463206
DATED : May 26, 2020
INVENTOR(S) : Linyi Gao and Qiang Yi Page 1 of 1

It is certified that error appears in the above-identified patent and that said Letters Patent is hereby corrected as shown below:

In the Claims

Claim 4, Column 37, Line 6 and 7: "of the at least one second policy" should read "of the second policy"

Claim 9, Column 38, Line 32 and 33: "whether use of each of the first policy" should read "whether each of the first policy"

Claim 13, Column 40, Line 42: "of the third policy rule" should read "of the at least one third policy rule"

Signed and Sealed this
Fourteenth Day of July, 2020

Andrei Iancu
*Director of the United States Patent and Trademark Office*